US007197514B2

(12) United States Patent
Boros et al.

(10) Patent No.: US 7,197,514 B2
(45) Date of Patent: Mar. 27, 2007

(54) MANAGING INFORMATION RELATING TO FIRESTOPPING SYSTEMS

(75) Inventors: Robert J. Boros, Maplewood, MN (US); Dennis L. Schaible, Placerville, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 721 days.

(21) Appl. No.: 10/217,343

(22) Filed: Aug. 9, 2002

(65) Prior Publication Data

US 2004/0030718 A1    Feb. 12, 2004

(51) Int. Cl.
*G06F 7/00*     (2006.01)
*G06F 17/00*    (2006.01)

(52) U.S. Cl. .................................................. 707/104.1
(58) Field of Classification Search ............. 707/104.1, 707/9; 705/11; 52/404.3, 39; 454/342
See application file for complete search history.

(56) References Cited

U.S. PATENT DOCUMENTS

| 5,189,606 | A  | 2/1993  | Burns et al. |
| 5,712,990 | A  | 1/1998  | Henderson |
| 5,950,206 | A  | 9/1999  | Krause |
| 6,369,695 | B1 | 4/2002  | Horon |
| 6,487,457 | B1 | 11/2002 | Hull et al. |
| 2001/0027407 | A1 | 10/2001 | Mori |
| 2002/0038355 | A1 | 3/2002  | Mager et al. |
| 2003/0004598 | A1 | 1/2003  | Morris |

OTHER PUBLICATIONS

Anderson, "Safety First", Security Works, Aug. 1997, Accessed on Internet at http://www.securitymanagment.com/library/000388.html Last Modified: Dec. 19, 2001, Accessed: Oct. 24, 2005.*
Dieken, "Installing Fire Protection Systems: How to Manage Costs, Maximize Effectiveness and Avoid Common Mistakes", The Locomotive, 1997, Accessed at http://www.hsb.com/thelocomotive/Story/FullStory/ST-FS-FIREPRO.html on Oct. 24, 2005.*
Anderson, "Safety First", Security Works, Aug. 1997, Accessed on Internet at http://www.securitymanagment.com/library/000388.html, Last Modified: Dec. 19, 2001, Accessed: Oct. 24, 2005).*
Office of Safety Regulation, "Inspection Technical Procedure, I-137, Inspection of Fire Protection System Construction", Revision 0, Aug. 13, 2001.*

* cited by examiner

*Primary Examiner*—Jeffrey Gaffin
*Assistant Examiner*—Michael J. Hicks

(57) ABSTRACT

A system for the management of information relating to the installation of firestopping systems within one or more facilities by contractors includes a network server and client devices that interact with the network server via a computer network. The client devices may be associated with administrators and contractors. The network server collects information from the contractors that describes a penetration of a fire-rated structure or an installation of a fire-rated duct, and direct a database server to generate a record for the penetration or duct based on the collected information and store the record in a database. The information may include the contractor, an authorizer, work-type, location, and one or more firestopping systems to be installed. The network server may provide the contractors with lists of permissible selections for the information. The network server may generate these lists from information stored in the database that was previously provided by administrators.

11 Claims, 15 Drawing Sheets

MANAGING INFORMATION RELATING TO FIRESTOPPING SYSTEMS

TECHNICAL FIELD

The invention relates to firestopping systems, and more particularly, to management of information relating to the installation of firestopping systems for one or more facilities.

BACKGROUND

Buildings may be constructed with fire-resistive walls, floors, floor/ceiling assemblies, and grease and air ducts. Building safety codes promulgated by a variety of regulatory agencies may mandate the use of such fire-resistive structures, which resist the spread of a fire in one room to adjacent rooms. A penetration of a fire-resistive structure is an opening created through such a structure to accommodate items such as electrical cables, telecommunications cables, conduit, pipe, ducts, and the like. Penetrations breach the integrity of the fire-resistive structure, potentially allowing flames, deadly gases and toxic smoke to pass from one room to adjoining rooms or throughout the building.

Firestopping systems are field-erected constructions consisting of one or more devices and/or materials that protect against the passage of flames, deadly gases and toxic smoke through the openings that are created for penetrations, and reinforce the fire-resistivity of grease and air ducts. Building safety codes may require the use of firestopping systems to restore the integrity of penetrated fire-resistive structures, or to reinforce the fire-resistivity of ductwork. Building safety codes may specify the particular firestopping system or class of firestopping systems that must be used for a particular type of penetration or duct. The contractor who creates the penetration or installs the duct, or a contractor subsequently hired to install firestopping systems for existing penetrations or ducts, may install the firestopping systems.

Facilities, which may include one or more buildings, may need to demonstrate compliance with regulations requiring the installation of firestopping systems in penetrations to a regulatory agency, which may be a governmental agency, or an independent audit organization. Failure to demonstrate compliance with these regulations may lead to loss or suspension of a license, condemnation of a building, fines, or loss of funding from a source that requires compliance. As one example, health care facilities must demonstrate compliance with the firestopping standards of the Joint Commission on Accreditation of Healthcare Organizations (JCAHO) in order to receive Federal funding. Other facilities subject to regulation include schools, universities, government facilities, telecommunications facilities, factories, or the like. In any case, failure to comply with firestopping regulations or inability to demonstrate compliance with firestopping regulations may be costly for the facility, or an organization of which the facility is a part.

In order for an administrator or administrative department that oversees the facility to know whether the facility is in compliance with the relevant regulations, the administrator or administrative department may want to maintain records of all penetrations and all installed firestopping systems in the buildings of the facility. Further, in order to facilitate or expedite an inspection by a regulatory agency, the administrator or administrative department may want to produce these records to the regulatory agency. For many administrators or administrative departments, particularly those that oversee large facilities with multiple buildings, maintaining records of penetrations made and firestopping systems installed to remedy those penetrations is a time consuming task complicated by many potential problems.

For example, contractors, such as electrical or telecommunications cable installers, diagnostic equipment installers, HVAC installers, alarm installers, and the like, are often hired at the departmental level. These contractors may enter a building of the facility, create one or more penetrations, or install one or more ducts, and leave the building, all without the administrator or administrative department being aware of their presence, much less what penetrations were made or ducts were installed where, and what, if any, firestopping systems were installed to remedy the penetrations or reinforce the ducts. When the administrator or administrative department eventually does receive documentation of what work was done, and where it was done, that documentation may be incomplete. Further, the documentation may be received from the contractor as a paper document, such as a work order, the form of which may vary from contractor to contractor.

Significant administrative resources may be required to cull any useful information from whatever documentation is provided by contractors, follow up with the contractors to fill in any gaps in the information provided by the contractors, or periodically inspect the facility to determine what penetrations have been made, what ducts have been installed, and what firestopping systems have been installed when the information has not or cannot be received from the contractors. Moreover, the resulting records may be incomplete or disorganized, which may prevent the facility from knowing whether it is in compliance with relevant regulations, and may place the facility in peril of failing an inspection by a regulatory agency or audit organization.

SUMMARY

In general, the invention is directed to a system, device and method for managing information relating to firestopping systems installations by contractors within one or more facilities. The invention may be implemented via a computer network having a network server and at least one client device, or by a device having a processor, a database, and contractor and administrator interfaces. The invention provides for the collection of information from contractors that describes a penetration of a fire-rated structure or the installation of a fire-rated duct, and the generation of records based on the receipt of the information.

The record may take the form of a permit that describes a firestopping system installation by one or more contractors for a particular penetration or duct. The collected information may include the contractor, an authorizer, work-type, location, and one or more firestopping systems to be installed relative to a penetration or duct. The record generated based on the collected information may be stored within a database, where it may be retrieved and used to generate reports documenting firestopping installations within a facility or organization. The reports may be generated for reviewers, such as regulatory agencies or audit organizations. The information also may be useful to administrators in simply tracking the progress of firestopping work orders. The reports may be delivered to the administrators or reviewers via the computer network.

The network server or processor may provide the contractors with lists of permissible selections for collection of the information. The network server or processor may generate these lists from information stored in the database, which was previously provided by administrators. This preloaded information may include firestopping system information, administrator information, authorizer information, reviewer information, contractor information, and location information. Location information may describe the buildings, floors and rooms of the one or more facilities.

In one embodiment, the invention provides a method comprising collecting information that describes a penetration of a fire-rated structure within a facility from a contractor, generating a record for the penetration based on the receipt of the information, and storing the record in a database.

In another embodiment, the invention provides a system comprising a client device and a network server. The client device is associated with a contractor and connected to a network. The network server collects information that describes a penetration of a fire-rated structure within a facility from the contractor via the client device and the network, and directs a database server to generates a record for the penetration based on the collected information and store the record in a database.

In another embodiment, the invention provides a device comprising a contractor interface and a processor. The processor collects information that describes a penetration of a fire-rated structure within a facility from a contractor via the contractor interface, generates a record for the penetration based on the collected information, and stores the record in a database.

In another embodiment, the invention is directed to a computer-readable medium containing instructions. The instructions cause a programmable processor to collect information that describes a penetration of a fire-rated structure within a facility from a contractor, generate a record for the penetration based on the collected information.

In another embodiment, the invention is directed to a method comprising inspecting a facility to identify areas of noncompliance with firestopping regulations within the facility, developing a plan to remedy the areas of noncompliance, hiring contractors to remedy the areas of noncompliance according to the plan, collecting information from the contractors that describes the work done by the contractors, and providing the information collected from the contractors to at least one reviewer.

The invention may be capable of providing one or more advantages. Using the invention to condition issuance of building or work permits on whether contractors have provided the information desired by the administrators may advantageously reduce the likelihood that a contractor could create a penetration, install a duct, or install a firestopping system without proper authorization, without an administrator being aware of the installation, or without providing adequate information for later review by administrators or a reviewer, such as a regulatory agency or audit organization. In other words, use of a permit process promotes population of a firestopping database by the contractors themselves, providing more complete and accurate data collection. Population of the firestopping database by the contractors also advantageously reduces the administrative burden for the facility or organization in which the firestopping materials are installed.

By more effectively collecting information from contractors, the invention may allow administrators to more timely determine that the facility is not in compliance with applicable regulations, such that the administrator may have a better opportunity to take corrective action to ensure facility safety, and also improve regulatory compliance before an inspection by a regulatory agency or audit organization.

Further, the invention may allow administrators to provide regulatory agencies or audit organizations with more complete records and reports detailing penetrations and ductwork within the facility and firestopping systems installed to remedy those penetrations and reinforce the ductwork.

As a further example, using the invention to collect uniform information from contractors may advantageously reduce the administrative overhead caused by receiving information from different contractors in different formats. Maintaining the received information within a database using uniform categories of information may improve administrators ability to search for particular records or generate reports from those records. In particular, the use of a consistent descriptive vocabulary by various contractors during data entry may be promoted by the use of preloaded information for contractor selection via dropdown menus, checkboxes, and other input media that support a controlled vocabulary. Thus, the invention may allow administrators to provide regulatory agencies or audit organizations with better organized records and reports providing a consistent and predictable body of information that details penetrations and ductwork within the facility and firestopping systems installed to remedy those penetrations and reinforce the ductwork.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
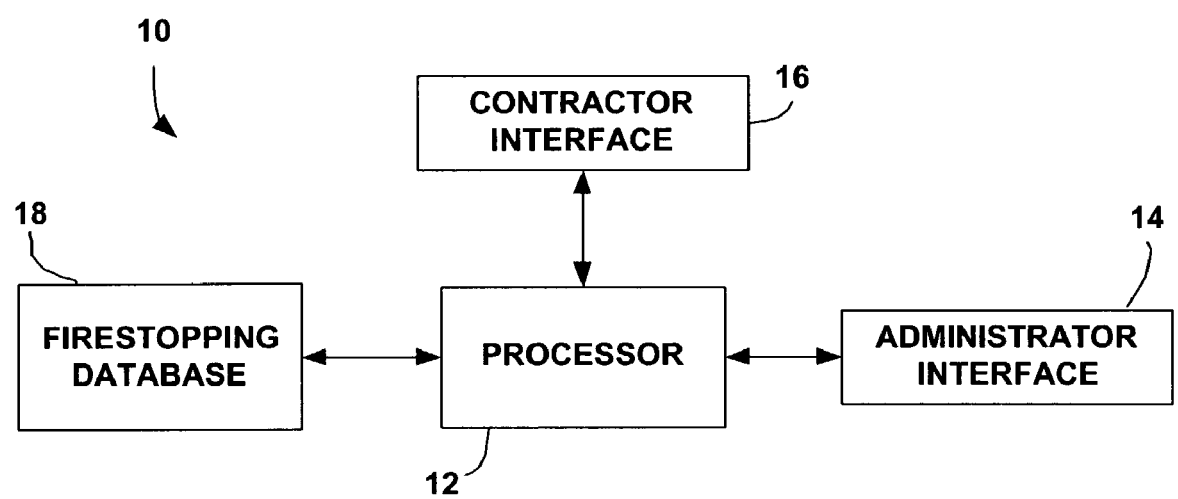
FIG. 1 is a block diagram illustrating an example device for managing information relating to the installation of firestopping systems.

FIG. 1 is a block diagram illustrating an example device 10 for managing information relating to the installation of firestopping systems for one or more facilities or organizations. As shown in FIG. 1, device 10 may include a processor 12, an administrator interface 14, a contractor interface 16, and a firestopping database 18. Administrators or an administrative department (hereinafter administrators) that oversee the facilities, and contractors who will be doing work in one or more buildings of the facilities, may interact with processor 12 via administrator interface 14 and contractor interface 16, respectively. Device 10 provides for the collection of information from contractors that describes a penetration of a fire-rated structure or an installation of a fire-rated duct, and the generation of records based on the receipt of the information. The collected information in the record may be useful to administrators and reviewers, such as regulatory agencies or audit organizations, in evaluating fire safety compliance within a facility or organization. The information also may be useful to administrators in simply tracking the progress of firestopping work orders.

Processor 12 executes instructions embodied in application program code to receive information from administrators via administrator interface 14 and from contractors via contractor interface 16, and to process and manage the received information. Processor 12 may store received information in database 18 in one or more records. Processor 12 may also receive and store files in database 18, such as text, audio and image files in a variety of formats. These files may be stored within records within database 18. Alternatively, processor 12 may store files within a separate file archive (not shown), and may store the location of the files within the file archive within records in database 18, or may store the location of files stored outside of device 10, such as files available via the Internet (not shown), within records in database 18. Storing files outside of database 18 may be desirable to improve the performance of database 18. Administrators and contractors may access selected records and files stored in database 18 via processor 12, using administrator interface 14 or contractor interface 16. Using administrator interface 14, administrators may further direct processor 12 to generate reports using selected records stored in database 18.

Device 10 may be a computing device, such as a desktop or portable personal computer, an interactive kiosk, or the like. Administrator interface 14 and contractor interface 16 may both be provided via the computing device. Administrator interface 14 and contractor interface 16 may represent different views of device 10 presented to administrators or contractors by processor 12. In other words, administrator interface 14 may provide administrators access to different resources and functionality provided by processor 12 and database 18 than that provided to contractors via contractor interface 16.

It may be desirable to locate device 10 within a facility such that it is accessible both to contractors as they enter and exit the facility, and to administrators of the facility. Access to both administrator interface 14 and contractor interface 16 may be controlled by user identification and passwords, as well as machine-readable credentials such as magnetically readable, optically readable, or radio frequency cards, fobs, or the like. In addition to controlling which interface is provided to a user, and thus what level of access is provided to a user, use of user identification and passwords may also protect the information within database 18 from access by unauthorized non-users.

Processor 12 may take the form of a central processing unit (CPU) within device 10. The program code that processor 12 executes may be stored in fixed or removable magnetic or optical computer-readable media, such as magnetic tapes, magnetic disks, or optical disks. Database 18 may also be maintained by processor 12 in fixed or removable magnetic or optical computer-readable media to store information provided by processor 12. In some embodiments of device 10, the program code may be stored and database 18 may be maintained within the same medium. In other embodiments, database 18 may be stored remotely from device 10, e.g., on a database server.

Administrator interface 14 and contractor interface 16 may be provided via user input devices (not shown), display devices (not shown), and printers (not shown) associated with device 10. A user input device may take the form of a keyboard, a pointing device, or a combination of both. A display device may take the form of a cathode ray tube (CRT) monitor or flat panel display. The user input device and the display device may, where device 10 takes the form of an interactive kiosk for example, take the form of a touch-screen display.

Administrators for the facilities may use device 10 to collect information from contractors that describes penetrations of fire-rated structures made or fire-rated ducts installed by the contractors within the one or more buildings of the one or more facilities. This information may include firestopping systems installed by the contractors to remedy such penetrations or reinforce the fire-rated ductwork. Use of system to collect and manage this information may allow administrators to better determine on a timely basis whether the facility is in compliance with applicable regulations. If the administrator is able to more timely determine that the facility is not in compliance with applicable regulations, the administrator may have a better opportunity to take corrective action for fire safety purposes, or in anticipation of an inspection by a regulatory agency or audit organization, such as the Joint Commission on Accreditation of Healthcare Organizations (JCAHO). Moreover, device 10 may allow the administrators to provide regulatory agencies or audit organizations with better organized and more complete records and reports detailing penetrations and ductwork within the facility and firestopping systems installed to remedy those penetrations and reinforce the ductwork.

In one embodiment, device 10 may be used to generate building access and/or work permits for contractors. Issuance of such permits to a contractor may be made to depend on whether the contractor has provided the information desired by the administrator via contractor interface 16. For example, when a contractor has provided processor 12 with sufficient information via contractor interface 16, processor 12 may direct a printer to print out a permit that the contractor may carry with him during the duration of the firestopping installation project. Alternatively, the contractor may be required to obtain a new permit each day during the course of a project.

The contractor may present the permit to an administrator or security personnel to demonstrate authorization for access to the facility or worksite within the facility. In addition, device 10 may notify individuals, such as administrators or the individual who authorized the contractor to perform the work, when such a permit has been issued. This notification may be provided, e.g., by processor 12 sending an email indicating the event to such an individual via a network connection (not shown). Other forms of notification such as telephone messages, pager messages, modal messages displayed within the application running on device 10, or the like may be provided. This notification may be provided concurrently with generation of the permit or prior to generation of the permit. In the latter case, device 10 may require approval feedback from an administrator prior to generating the permit, e.g., by return email or clicking approval within the application running on device 10. In this manner, device 10 may advantageously reduce the likelihood that a contractor could create a penetration, install ductwork, or install a firestopping system without proper authorization, without an administrator being aware, or without providing adequate information for later review by administrators or a regulatory agency or audit organization.

Administrators may further use device 10 to collect uniform categories of information from each contractor. These categories of information may be the fields of a table of records stored within database 18, wherein each record contains the information provided by a contractor who was issued a permit. These categories of information may include: authorizer information, which indicates who authorized the work to be done by the contractor; work-type information, which indicates the type of work to be performed by the contractor; location information, which indicates the location of the work to be done by the contractor; and firestopping system information; which indicates whether firestopping systems are to be installed at this location and which firestopping systems are to be installed.

The categories of information can be presented in a controlled, consistent manner using dropdown menus, check boxes, and the like. In this manner, the contractors are forced to enter data from a controlled vocabulary or controlled set of selections. Using device 10 to collect information from contractors in this manner may advantageously reduce the administrative overhead caused by receiving information from different contractors in different formats, often via paper documents such as work orders. Moreover, much of the data entry burden is shared among the contractors themselves, facilitating the population of the firestopping database 18 without excessive intervention by administrators or other data entry operators associated with the facility. Maintaining the received information within database 18 in this manner may advantageously allow administrators to search records within database 18 based on the categories of information to find records of interest, and then access those records or generate reports from those records. Again, the information can be highly valuable in ensuring fire safety compliance and preparing for or undertaking audits.

Via administrator interface 14 and processor 12, administrators may preload database 18 with information that falls within the above-described categories, as well as other information required by processor 12 to perform the functions ascribed to processor 12 herein. This preloaded information may also be stored within tables of records in database 18. For example, administrators may preload the database with firestopping systems information, administrator information, authorizer information, reviewer information, contractor information and location information. Some of this information provided by administrators may later be provided to contractors by processor 12 via contractor interface 16 as selections for the contractors to make when providing information to obtain a permit from device 10. For example, contractors may select from lists of authorizers, work-types, locations, and firestopping systems generated based on the information provided by administrators.

Further, selections made by a contractor within a first list may reduce the number of choices made available to the contractor by processor 12 in other lists. For example, the firestopping systems information provided by the administrator may associate work-types with firestopping systems. In other words, the firestopping system information may indicate with what work-types a particular firestopping system is approved for use. If a contractor selects a particular work-type from a work-type list, processor 12 may only allow the contractor to select firestopping systems to be installed from a list of firestopping systems associated with that work-type. The associated firestopping systems may represent systems that have been recommended by administrators for use in the facility. By preloading information in database 18 such that lists may be provided to contractors as described, administrators may use device 10 to further control the information received from contractors.

Database 18 may also be preloaded with files containing specifications and installation instructions for various firestopping systems. Processor 12 may provide these specifications and instructions to contractors via contractor interface 16. These files may be loaded to database 18 by processor 12 from removable or fixed media, such as magnetic tape, magnetic disks, or compact disks, or via a network connection. Alternatively, these files may be loaded to a file server (not shown) and the location of these files within the file server may be stored within records in database 18. Alternatively, a link, such as a hypertext link, which may be provided to contractors via contractor interface 16 and used by processor 18 to retrieve these files via the Internet (not shown) and a network connection (not shown) may be stored within records in database 18. Files retrieved from the Internet may be retrieved from web servers maintained by manufacturers of the firestopping systems. Contractors may print these files using a printer associated with device 10.

After the contractors have provided all required permit issuance information to device 10, administrators may access the records within database 18 that were created using this information to review the information or to generate reports based on the information. Administrators may use device 10 as part of a review process. This review or approval process may involve using location information stored in the records to find the work done by contractors, inspecting the work, and approving the work if done correctly. Upon approving the work, the administrator may modify the appropriate record within database 18 to indicate that the work was approved via administrator interface 14 and processor 12. If a record of a penetration or duct stored within database 18, or a subsequent inspection by an administrator indicates that a penetration was created or duct installed but no firestopping system was installed, an administrator may take appropriate action, such as requiring the contractor to return to install a firestopping system or hiring a new contractor to install a firestopping system for the penetration or duct.

As part of the approval process, the reviewing administrator may also load files into the record via administrator interface 14 and processor 12 after the work has been completed by the contractors. For example, the administrator may take a digital picture of the worksite or scan a representative picture of the work performed by the contractor, and load the image file into the record within database 18. These pictures may be later provided to the regulatory agency to expedite its inspection of the facility. In some cases, it is envisioned that a preliminary audit may be performed by inspecting digital photos of completed work stored in facility firestopping database 18 with pertinent firestopping job records without actually visiting the worksite. The digital photo would be associated, for example, with a particular record detailing location, date, contractor, firestopping material used, and the like. This approach, at least on a preliminary basis, may save substantial administrator time.

Figure 2:
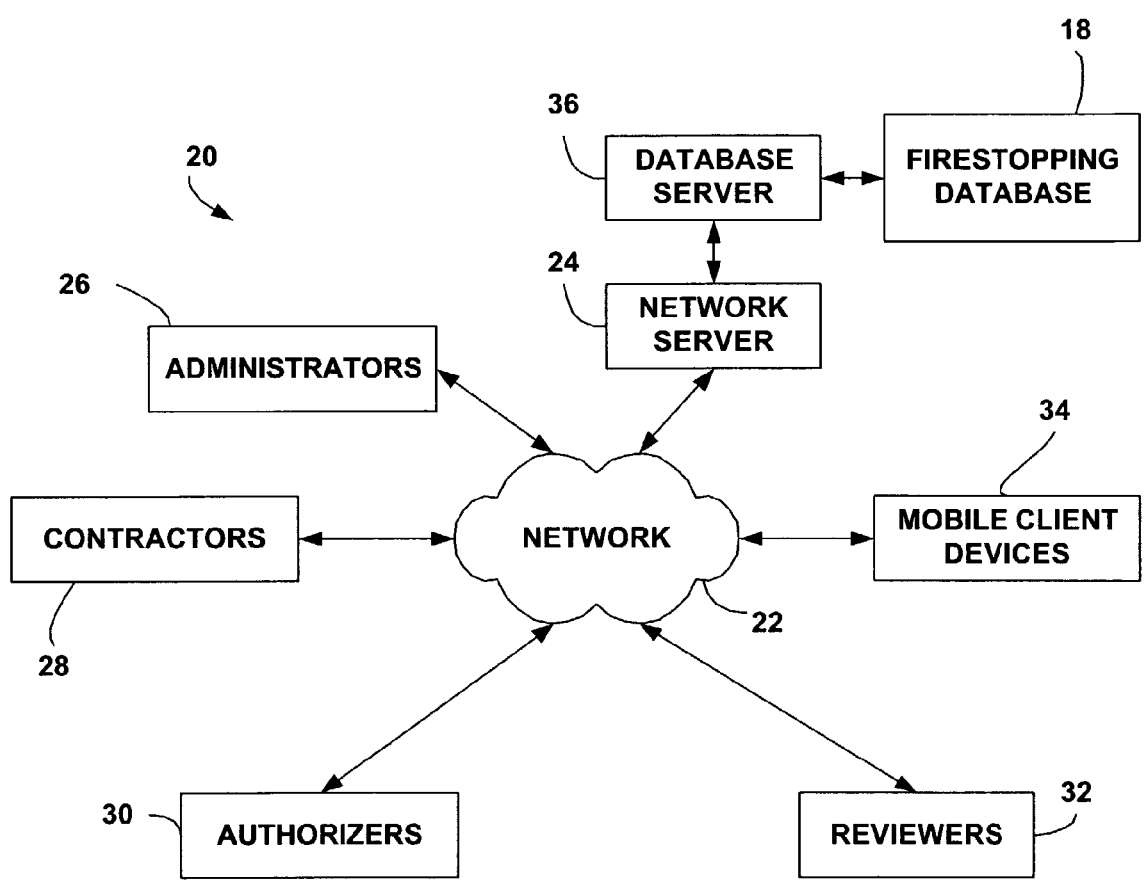
FIG. 2 is a block diagram illustrating an example system for managing information relating to the installation of firestopping systems.

FIG. 2 is a block diagram illustrating an example system 20 for managing information relating to the installation of firestopping systems in one or more facilities. System 20 provides functionality similar to device 10 of FIG. 1, but may be implemented via a computer network 22, which may take the form of a LAN, WAN, or a global computer network such as the World Wide Web. As shown in FIG. 2, system 20 may include a network server 24 coupled via network 22 to a number of client devices associated with administrators 26, contractors 28, authorizers 30 and reviewers 32. System 20 may also include one or more mobile client devices 34, which may be coupled to network server 24, e.g., via a wireless connection to network 22. As shown in FIG. 2, network server 24 may be coupled to a database server 34, which is in turn coupled to database 18.

Administrators 26, contractors 28, authorizers 30, and reviewers 32 are network clients within system 20. As described above, administrators 26 may take the form of one or more individuals or an administrative department that oversee one or more facilities. Contractors 28 may take the form of one or more individuals, a firm, or an internal department who will be doing work in one or more buildings of the one or more facilities overseen by administrators 26. Authorizers 30 may take the form of one or more individuals or departments with the capability to authorize contractors 28 to do work at the one or more facilities. In some cases, a particular authorizer 30 may also be an administrator 26. Reviewers 32 may take the form of one or more regulatory agencies or independent audit organizations responsible for verifying compliance of facilities with applicable standards. Reviewers 32 may also take the form of internal audit departments charged with auditing the performance of the facilities.

In some cases, administrators 26 may delegate one or more of the functions or responsibilities ascribed to administrators 26 and authorizers 30 herein to an organization or entity that would perform the functions or assume the responsibilities as a service to the administrators 26. For example, the service provider may set up system 20 for the facility, preload database 18 with information, and use system 20 to collect information from contractors as described above. The service provider may authorize and hire contractors 28 for the facility, or provide contractors 28 that are employees of the organization or entity. The service provider may provide an approval process as described above. The service provider might inspect work done at the facility by contractors 28, and certify that the work was completed satisfactorily. The service provider might document the work done during the inspection by taking photos and the like, as described above. The service provider might receive notification of the completion of a work permit, as described above, or may make regularly scheduled inspections. The service provider may also act as a liaison between administrators 26 and reviewers 32 by providing expertise with the relevant regulations, preparing reports for reviewers 32, and assisting during inspection by reviewers 32.

The client devices associated with administrators 26, contractors 28, authorizers 30, reviewers 32 may take the form of a variety of devices that permit a user to access resources on network 22. Examples of suitable client devices include desktop and portable personal computers operating in a Windows, Macintosh, Unix, or Linux environment, personal digital assistants (PDAs) based on a Palm, Windows CE, or similar operating system environment, Internet-equipped wireless telephones, and other Internet appliances. Mobile clients devices 34, in particular, may take the form of PDAs, Internet-equipped wireless telephones, and other Internet appliances, and may be used by administrators 26, contractors 28, authorizers 30 and reviewers 32 as a means to interact with network server 24 when mobility is desired. The client devices may also take the form of an interactive kiosk, which may provide a touch-screen display as described above. Each client device may execute instructions embodied in application software to interact with and access resources provided by network server 24. For example, each client device may utilize a graphical viewing application, such as a web browser, to access resources residing on network server 24.

Each of the client devices may connect to one or more LANs included within network 22 via a network connection, or may connect to a network 22 via a dial-up connection. Client devices, particularly mobile client devices 34, may also connect to network 22 via a wireless connection. The wireless connection may be a local wireless connection via a wireless access point to a wireless local area network (WLAN) that is included within network 22. The local wireless connection may be a radiofrequency connection in accordance with the Bluetooth specification set or the 802.11 specification set, or an infrared connection in accordance with the InfraRed Data Association (IRDA) specification set. The wireless connection may also be made using the cellular telephone communications infrastructure, which may be advantageous where mobile clients will be traveling where no WLAN access is available.

The client devices may interact with network server 24 to provide administrators 26 with administrator interface 14 and contractors 28 with contractor interface 16, as described above with reference to FIG. 1. Moreover, client devices may interact with network server 24 to provide authorizers 30, reviewers 32, and mobile clients 34 with appropriate interfaces with network server 24 based on the level of access to the resources and functionality appropriate for such users. These interfaces may include web pages, e.g., files encoded with Hypertext Markup Language (HTML), Extensible Markup Language (XML), or the like, generated by network server 24. These interfaces may be provided by user input devices, display devices, or printers associated with the client devices, as described above. Access to these interfaces may be controlled by user identification and passwords, as well as machine-readable credentials such as magnetically readable, optically readable, or radio frequency cards, fobs, or the like, as described above.

Network server 24 may include one or more computing devices including one or more processors that cooperate to provide the functionality described herein. In addition, network server 24 may execute a variety of software applications that interact with software processes running on different machines to provide the functionality described herein. The software applications executed by network server 24 may be stored in fixed or removable magnetic or optical computer-readable media, such as magnetic tapes, magnetic disks, or optical disks.

In general, network server 24 interacts with client devices associated with administrators 26 and contractors 28, database server 36 and database 18 to provide the functionality ascribed to processor 18 of device 10 as described above with reference to FIG 1. Network server 24 may receive information from administrators 26 and from contractors 28 via the client devices and network 22, and process and manage the received information. Network server 24 may interact with database server 36 to store the received information in database 18 in one or more records. Network server 24 may also receive files via network 22, such as text, audio and image files in a variety of formats, and store the files within records within database 18 as described above. Alternatively, system 20 may include a file server (not shown) and file archive (not shown). Network server 24 may interact with the file server to store files within the file archive, and associate the files with records within database 18.

Administrators 26 and contractors 28 may access selected records and files stored in database 18 using their associated client devices, network 22 and network server 24. Administrators 26 may further direct network server 24 to generate reports using selected records stored in database 18. Database 18 may be maintained in fixed or removable magnetic or optical computer-readable media to store information provided by administrators 26 and contractors 28 via the associated client devices, network 22, and network server 24.

In general, system 20 provides similar features and advantages to administrators 26 as provided by device 10 as described above with reference to FIG. 1. Administrators 26 may use system 20 to collect information from contractors that describes penetrations made by the contractors, ducts installed by the contractors, or firestopping systems installed by contractors to remedy penetrations or reinforce the ducts within the one or more buildings of the one or more facilities, providing the advantages described above. System 20 may be used to generate building access and/or work permits for contractors 28, with the issuance of a permit being conditioned on providing adequate information, providing the advantages described above.

Administrators 26 may use system 20 to collect uniform categories of information from each contractor, and may preload database 18 with information, providing the advantages described above. Database 18 may also be preloaded with files containing specifications and installation instructions for various firestopping systems, as described above. Administrators 26 may use system 20 access the records within database 18 that were created using this information to review the information or to generate reports based on the information, and as part of an approval process, providing the advantages described above.

System 20 may also provide additional features and additional advantages. For example, multiple client devices associated with administrators 26, contractors 28, authorizers 30, reviewers 32, and mobile clients 34 may be located in a geographically disparate fashion, and may be located where they are most accessible to their respective clients. This feature may make system 20 more convenient to use for the various network clients.

Client devices associated with administrators 26 and authorizers 30 may be located in offices of administrators 26 and authorizers 30 within the facility. Where administrators 26 and authorizers 30 are part of a large organization that includes more than one facility and system 20 is used to manage information for more than one facility, the associated client devices may be located wherever the offices of administrators 26 and authorizers 30 are located. Some or all of administrators 26 may also be authorizers 30, in which case administrators 26 and authorizers 30 would use common client devices. Devices associated with contractors 28, which in some embodiments may be interactive kiosks as described above, may be conveniently located at the entrances to buildings of the facility to encourage their use to receive a permit before contractors 28 enter the buildings of the facility. In some embodiments, where a firm of contractors 28 regularly does work at a facility, the contractor devices may be located at the place of business of the firm such that permits may be obtained before traveling to the facility. Where an internal maintenance department is to do work at the facility, the contractor devices may be located in the offices of the internal maintenance department within the facility. Devices associated with reviewers 32 may be located within the facility for on-site access by reviewers, or may be located at the offices of the reviewers for convenient access to system 20 off-site. Client devices associated with mobile clients 34 may travel throughout the facility, and may access system 20 outside of the facility. Network server 24 may be located within the facility, or may be remotely located.

Providing authorizers 30 with access to network server 24 via network 22 may provide advantages. Network server 24 may automatically provide authorizers 30 with notifications when work that they have authorized has begun or has been completed. The notifications may be provided via email. These notifications may be useful to authorizers 30 to confirm that the work was authorized, to determine the progress of authorized work, and to determine the time of the authorized work for accounting purposes. The notifications may provide an interactive medium, such as a hypertext link, used to allow authorizers to indicate that the work was indeed authorized. Authorizers 30 may also be granted access to network server 24 to review the permit records corresponding to the work that they authorized in order to determine the progress or time of the authorized work, or the accuracy of the records.

Providing reviewers 32 with access to network server 24 via network 22 may also provide advantages. As mentioned above, administrators 26 may direct network server 24 to generate reports from records within database 18 that include information received from contractors 26 that describes penetrations and/or installations of firestopping systems. These reports may be generated for the benefit of reviewers 32, to expedite or assist a review of the facility to determine if it is in compliance with relevant firestopping regulations. Administrators 26 may direct network server 24 to provide these reports to reviewers 32 via network 22, so that reviewers 32 may easily review the reports off-site. These reports may be delivered to reviewers 32 as a file, such as a web page, or via an email as an attachment. Administrators 26 may also save reports as a file within database 18, and reviewers 32 may be given access to database 18 via network 22 and network server 24 to access and review these reports.

Alternatively, reviewers 32 may be given access to system 20 in order to evaluate records and generate the reports desired themselves, remotely. For example, a reviewer 32 in New York may be given a password to access system 20, which in this example manages information for a facility in Los Angeles. This arrangement is advantageous because the reviewer 32 may complete a portion of the review that does not require the reviewer to be physically present at the facility. Further advantage is provided in that reviewers 32 generate their own reports, reducing the administrative burden on administrators 26 for the facility.

The use of mobile client devices 34 to interact with network server 24 via network 22 may also provide advantages. Administrators 26 may use mobile client devices 34, such as PDAs, as part of the approval process described above. An advantage provided by the mobility of mobile client devices 34 in this situation is that administrators 26 may receive a report of permit records within database 18 which they have not approved via the mobile client device 34, use the location information within the permit records to find and inspect the unapproved or pending penetrations or firestopping system installations, and modify the permit records to indicate their approval at each location, location by location on a "walkthrough" basis. As mentioned above, it may be useful for an administrator to carry a digital camera (video or still photo) through a facility to photographically document completed work, and then attach a digital photo to a record for the work. Audio recorders, handwriting capture devices, and the like may also be useful in quickly recording comments of reviewers concerning the completed work.

If the mobile client devices 34 can wirelessly connect to network 22 throughout the facility, administrators 26 may receive reports and access the permit records within database 18 and make the modifications at each location. Alternatively, administrators may first connect to network 22 via a wired or wireless connection at a location where such a connection is available and download a copy of the unapproved permit records within database 18 indicated by the report from network server 24, travel from location to location throughout the hospital modifying the local copy of the permit records stored on the mobile client devices 34 as appropriate, and then reconnect to network server 24 at a location where a connection is available in order to direct network server 24 to update database 18 with the modifications made.

Mobile client devices 34 may also be used by reviewers 32. Reviewers 32 may carry a mobile client device 34 while inspecting the facility. The mobile client devices may provide reviewers 32 easy access to reports or permit records within database 18 relevant to the locations within the facility that reviewers 32 are currently inspecting.

Figure 3:
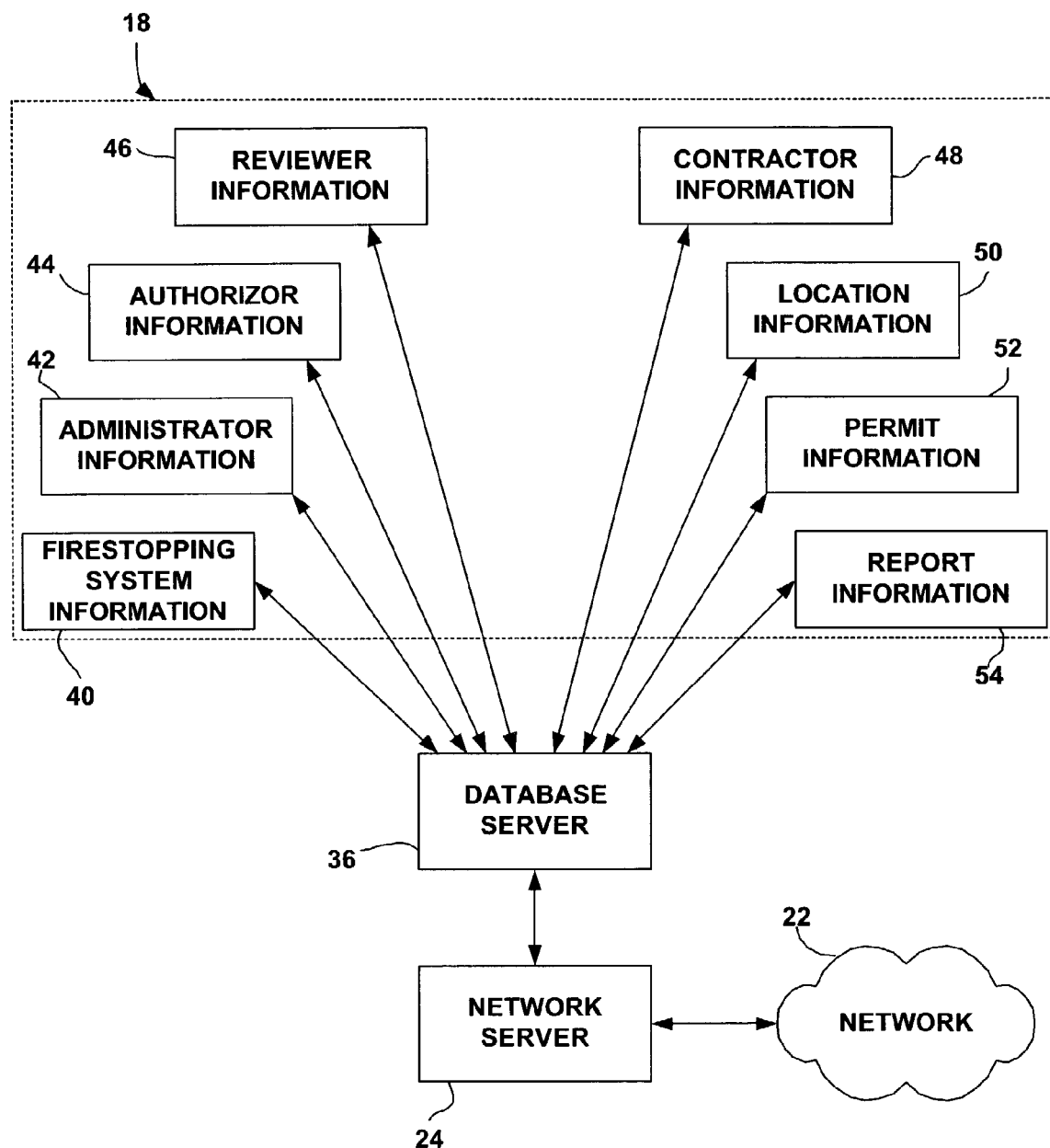
FIG. 3 is a block diagram illustrating the system of FIG. 2 in greater detail.

FIG. 3 is a block diagram illustrating system 20 in greater detail. In particular, FIG. 3 illustrates the types of information that may be stored within database 18. Although the description of the types of information that may be stored within database 18 that follows is to be understood to be applicable to device 10, the description will focus on system 20 for the ease of illustration.

As shown in FIG. 3, database 18 may store firestopping system information 40, administrator information 42, authorizer information 44, reviewer information 46, contractor information 48, location information 50, permit information 52, and report information 54. Firestopping system information 40, administrator information 42, authorizer information 44, reviewer information 46, contractor information 48, and location information 50 may be information that is preloaded in database 18 by administrators 26 via administrator interface 14 provided on administrator client devices, network 22 and network server 24. This information may be required by network server 24 to perform the functions ascribed to network server 24 herein. Some of this information may later be provided to contractors 28, by network server 24 via network 22 and contractor interface 16 provided on contractor client devices, as selections for contractors 28 to make when providing information to obtain a permit from system 20.

Network server 24 may receive the selections made by contractors 28 via network 22, and direct database server 36 to store this and other information in database 18 as permit information 52. Administrators 26 may direct network server 24 to access and search permit information 52, and to generate reports based on permit information 52. Administrators 26 may direct network server 24 to direct database server 36 to store reports as report information 54 in database 18.

Firestopping system information 40, administrator information 42, authorizer information 44, reviewer information 46, contractor information 48, location information 50, permit information 52, and reports 54 may be stored within tables of records within database 18. For example, firestopping system information 40 may take the form of a table of firestopping systems, wherein each record contains information about a particular firestopping system. Each record may, for example, contain one or more fields indicating the name of the firestopping system, one or more fields indicating the work-types for which the firestopping system may be used, and one or more fields containing specification or instruction files for the firestopping system. Where the specification or instruction files are not stored in the records, each record may alternatively have fields that contain a location of the file within a file server or a link to the files located on the Internet, as described above.

Each firestopping system record may also include a recommendation field that indicates whether a particular firestopping system is recommended for use in the one or more facilities. Administrators 26 may indicate their recommendation of the use of a particular firestopping system in the one or more facilities by modifying the recommendation field. The recommendation may be graphically represented, for example, as a checked box next to descriptive information identifying the particular firestopping system. Administrators 26 may, for example, base the recommendation on a preference for or relationship with a particular manufacturer of firestopping systems, or on the requirements of the regulations that govern the facility.

Administrator information 42, authorizer information 44, reviewer information 46, and contractor information 48 may take the form of tables of administrators, authorizers, reviewers, and contractors, respectively. Each record within the tables may include fields containing a name, title, address, phone number, email address, and other contact information for a single administrator 26, authorizer 30, reviewer 32, or contractor 28. Each record may also include a field containing a password used by the individual in question to gain access to an interface with network server 24. A table containing contractor information 48 may also include fields containing work-types that a particular contractor is associated with, e.g. types of work that the particular contractor does.

Location information 50 may take the form of one or more tables of locations within the facility. The records within the one or more tables may include fields containing building names, building addresses, names of floors within the buildings, and names of rooms on the floors. Network server 24 may direct database server 36 to maintain location information in database 18 within three tables—a building table, a floor table, and a room table. The building table may contain a record for each building of the facility that includes fields containing building names and fields containing the building addresses. The floor table may contain a record for each floor within the buildings of the facility listed in the building table, and each record may include fields containing a floor name, and fields containing the name of the building that the floor is within. The room table may contain a record for each room on the floors within the floor table, and each record may include fields containing a room name, fields containing the name of the floor that the room is on, and fields containing the name of the building that the floor is within. Exemplary methods by which these tables may be preloaded by administrators 26 via network server 24, and used by network server 24 to provide contractors with location selection lists during the permit process, will be described below.

Permit information 52 may take the form of a table containing information relating to permits to make penetrations, install ducts, or install firestopping systems issued to contractors 26 by system 20. Permit information 52 includes the information provided by contractors 26 when applying for the permit, and, as described above, may include, authorizers, work-types, locations, and firestopping systems installed. Thus, each record within a table of permits may include fields containing the identity and contact information of the contractor, a field containing an authorizer, a field containing a work-type, a field containing a building name, a field containing a floor name, a field containing a room name, and one or more fields containing the names of firestopping systems installed, if any firestopping systems were installed. Each record may also include a field indicating a permit number, fields indicating the time and date the permit was issued, the time and date the work was completed, and a field indicating whether administrators 26 have inspected and approved the work performed.

As mentioned above, authorizers 26 may direct network server 24 to access and search permit information 52, and to generate reports 54 based on permit information 50. Reports 54 may take the form of files created by network server 24 and used by client devices to display the information retrieved from permit reports 52 by network server 24. Reports 54 may be word processing documents, spreadsheets, or HTML or XML documents. Reports 54 may be displayed or printed by client devices, or administrators 26 may direct network server 24 to deliver reports 54 to reviewers 32 via network 22. Reports 54 may be delivered as an attachment to an email message, or as a link to a web page.

Administrators 26 may also direct network server 24 to direct database server 36 to store reports within records in database 18 as a table of reports. Reports may be generated for the benefit of administrators 26 and reviewers 32, and may be stored in database 18 for later access by administrators 26 and reviewers 32. Each record within a table of reports may include fields containing a report name, fields containing the generation date of the report, fields indicating the identity of individuals or classes of individuals who may access the report, and fields containing the report. Alternatively, the report may be stored in a file archive (not shown), and the location of the report may be stored within fields in the record.

FIGS. 4–15 describe exemplary methods in accordance with the present invention. Although the description of these methods is applicable to device 10, the description will focus on system 20 for the ease of illustration.

Figure 4:
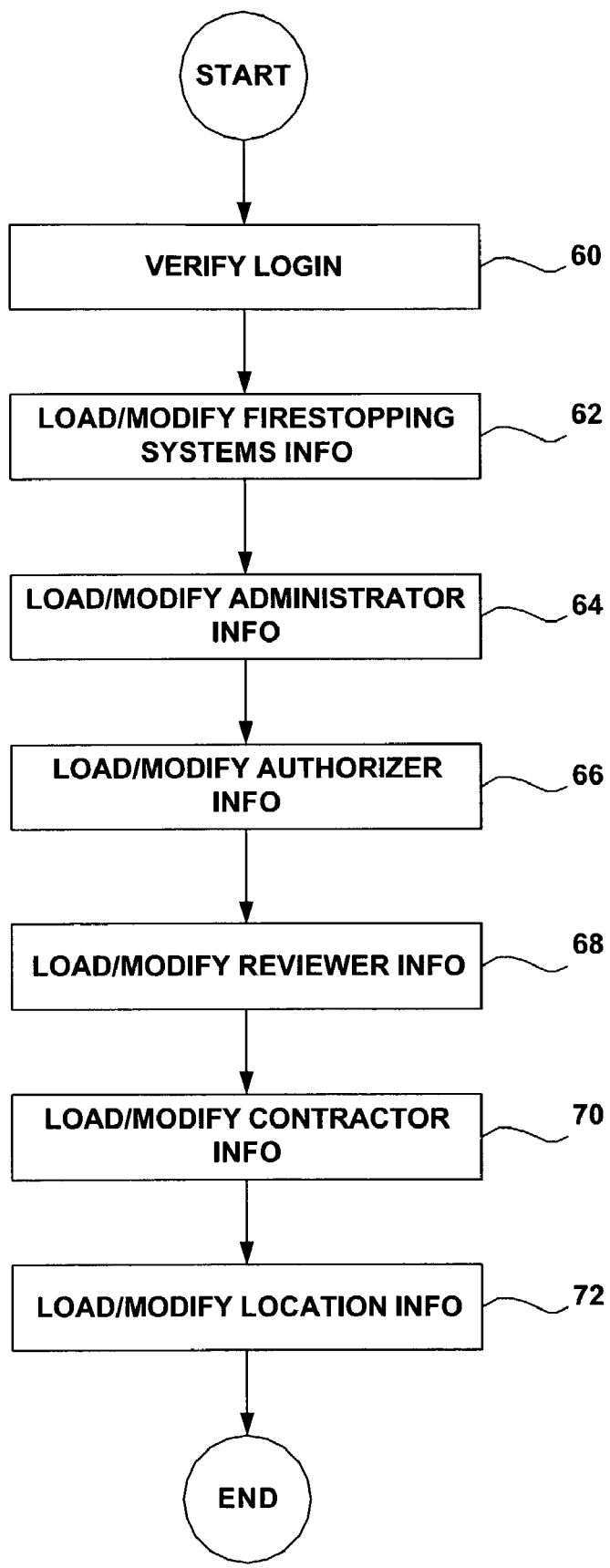
FIG. 4 is a flow diagram illustrating an example method that may be employed by administrators to load a database with information.

FIG. 4 is a flow diagram illustrating an example method that may be employed by administrators 26 to load database 18 with the information that may be required by network server 24 to perform the functions ascribed to network server 24. As described above, some of this information may later be provided to contractors 28 as selections for contractors 28 to make when providing information to obtain a permit from system 20. Therefore, it may be desirable for administrators 26 to preload database 18 with this information before contractors 28 are allowed to use system 20 to obtain permits. Administrators 26 may then update the information as changes to the information occur.

After receiving a user name and password associated with an administrator 26 (60), network server 24 may present the administrator 26 with administrator interface 14 via network 22 and a client device. By interacting with network server 24 via administrator interface 14, administrators 26 may load or modify firestopping system information 40 (62), administrator information 42 (64), authorizer information 44 (66), reviewer information 46 (68), contractor information 48 (70), and location information 50 (72) stored within database 18. Administrators 26 may preload this information by providing the information to network server 24, which may direct database server 36 to create new records within a firestopping systems table, an administrator table, an authorizer table, a reviewer table, a contractor table, and location tables. These records may each contain fields as described above. After system 20 is being used by contractors 28 to obtain permits, administrators 26 may interact with network server 24 to modify these records or add new records as changes in the information occur.

The present invention is not limited to loading information into database 18 in any particular order. However, in some situations, it may be advantageous to load certain types of information before others. For example, as described above, firestopping systems information 40 may include firestopping system names, associated specification or instruction files, associated work-types, and approval indications. In some embodiments of system 20, the names, files and work-types may be loaded from disks provided by one or more manufacturers of firestopping systems, or via the network from servers administered by the one or more manufacturers. Administrators 26 may also provide work-types to network server 24 to be stored within contractor information. It may be advantageous to load work-types provided by the manufacturers first, so that these work-types may be provided to administrators 26 as a list to select from when creating a new contractor record within contractor information 48. Loading work-types into firestopping systems information 40 and contractor information 48 in this manner may improve the likelihood that the work-types will be consistently named and defined.

Figure 5:
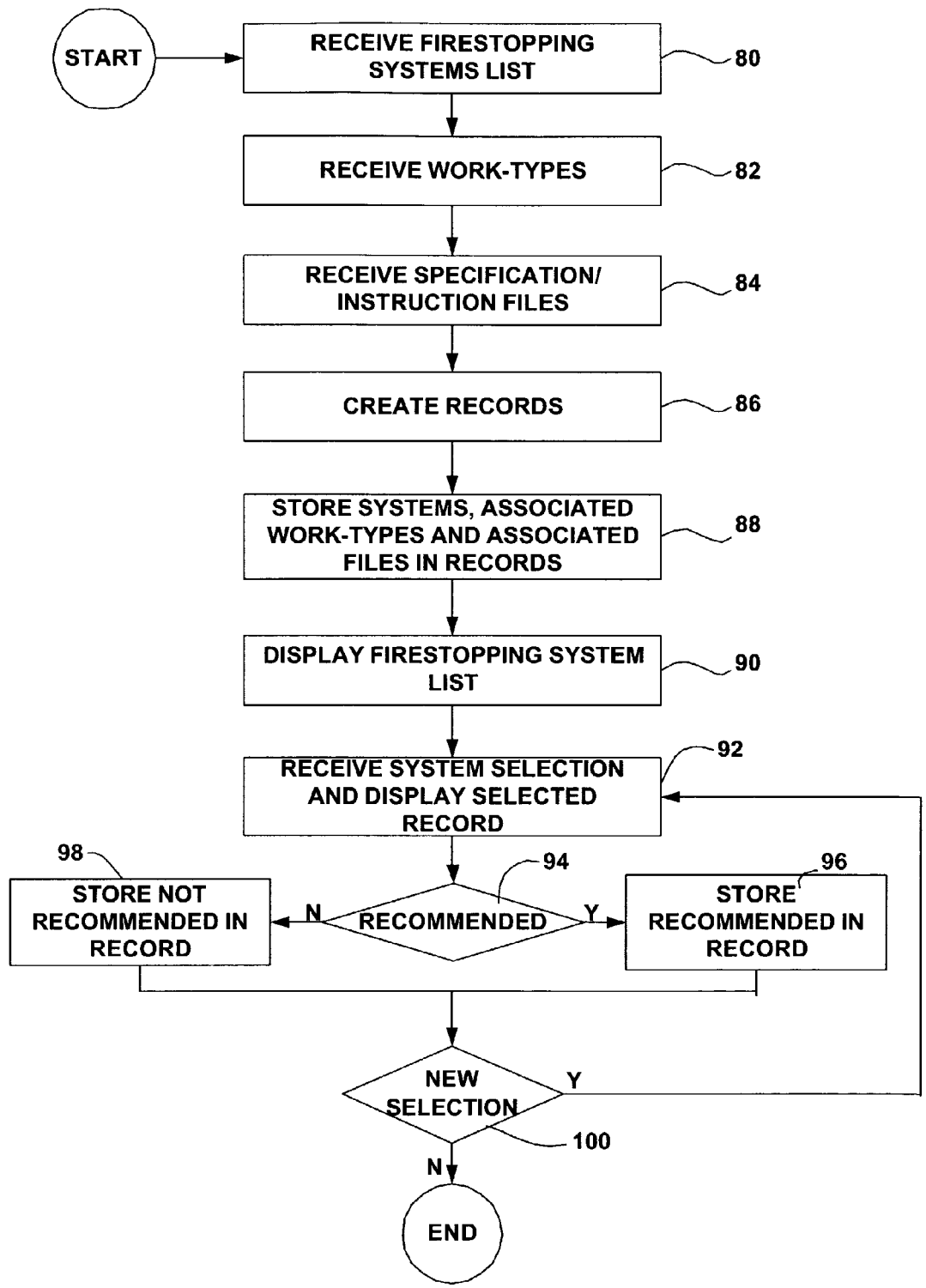
FIG. 5 is a flow diagram illustrating an example method for loading a database with firestopping system information.

FIG. 5 is a flow diagram illustrating an example method for loading database 18 with firestopping system information 40. Network server 24 may receive a list of firestopping systems (80), work-types associated with the firestopping systems in the list (82), and specification or instructions files for the firestopping systems within the list (84). This information may be received from one or more manufacturers via a disk or the Internet, as described above. Network server 24 may direct database server 36 to create a record for each firestopping system in the list in a table of firestopping systems within database 18 (86), and store the received information in fields of the records (88).

If the manufacturer does not provide work-types associated with the firestopping systems in the list, administrators 26 may select a record for a firestopping system and enter the work-types for that firestopping system manually. As described, above the specification or instruction files may be stored in a file archive or available on the Internet from a server maintained by the manufacturer. In these situations, network server 24 may direct database server 36 to store the locations of the files in the records as described above.

As described above, each firestopping system record created by database server 36 may include a recommendation field to indicate whether a particular firestopping system is recommended for use in the one or more facilities.

Administrators 26 may indicate their recommendation of the use of a particular firestopping system in the one or more facilities by modifying the recommendation field. Administrators 26 may, for example, base the recommendation on a preference for or relationship with a particular manufacturer of firestopping systems, or on the requirements of the regulations that govern the facility. This recommendation field may be used to limit the firestopping systems displayed to contractors 28 during the permit process, i.e., systems not recommended may not be displayed, or an indication of the recommendation or non-recommendation may be displayed to contractors 28 as part of a firestopping systems list.

In order for an administrator 26 to select firestopping systems to recommend, network server 24 may display a list of firestopping systems to the administrator 26 (90). Network server 24 may receive a selection of a firestopping system from the administrator 26 and display the selected record to the administrator 26 (92). If network server 24 receives an indication from the administrator 26 that the system is recommended for use within the facility (94), network server 24 may direct database server 36 to modify the record to indicate that the system is recommended (96). If network server 24 receives an indication from the administrator 26 that the system is not recommended for use within the facility (94), network server 24 may direct database server 36 to modify the record to indicate that the system is not recommended (98). This process may continue so long as network server 24 continues to receive selections from the administrator 26 (100).

Figure 6:
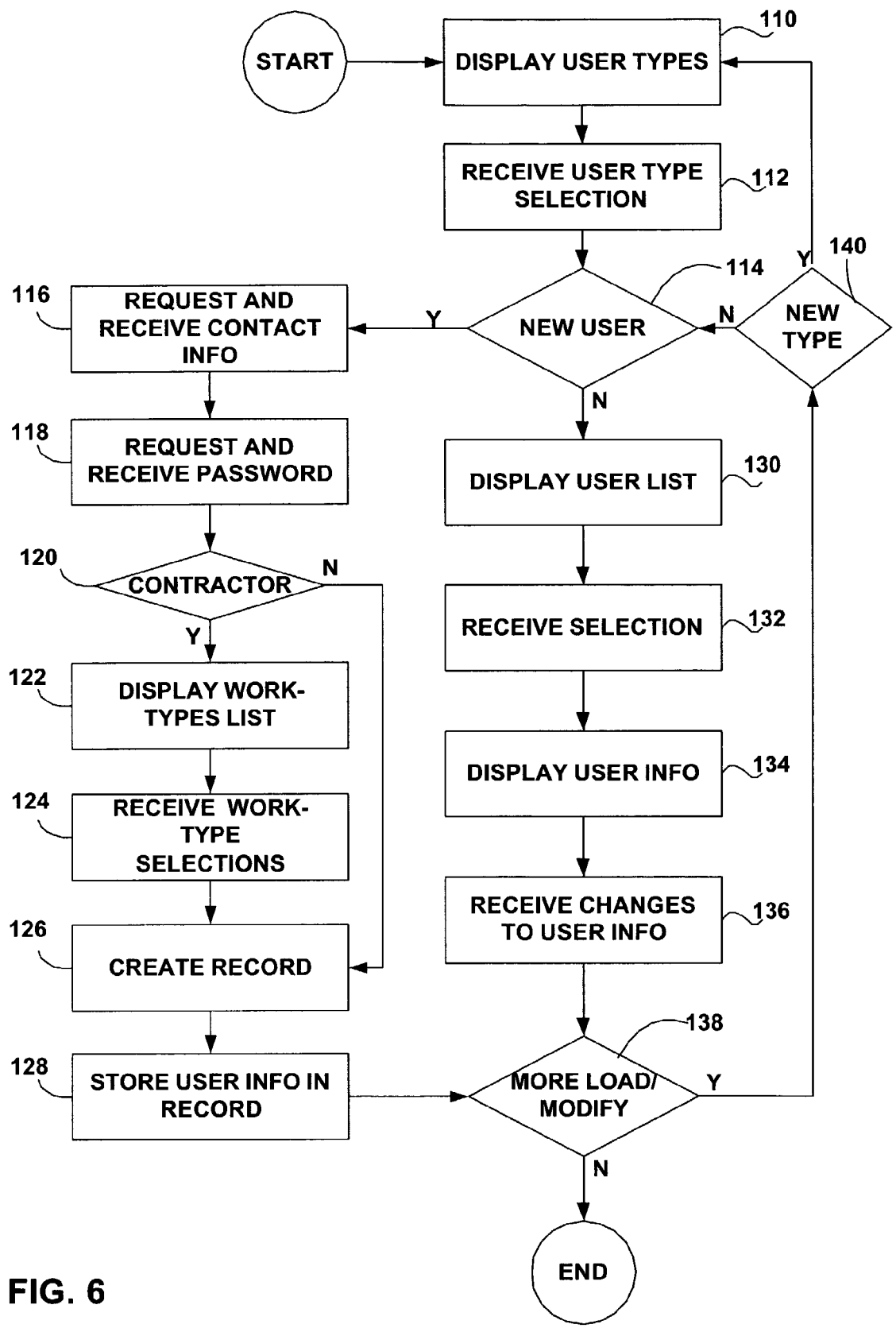
FIG. 6 is a flow diagram illustrating an example method for loading a database with user information.

FIG. 6 is a flow diagram illustrating an example method for loading database 18 with user information, such as administrator information 42, authorizer information 44, reviewer information 46, and contractor information 48. Network server 24 may, as described above, direct database server 36 to maintain each of these categories of user information within database 18 in separate tables, such as tables of administrators, tables of authorizers, tables of reviewers, and tables of contractors. Alternatively, network server 24 may direct database server 36 to maintain a single table of user information, wherein each record contains a field indicating what type of user the record pertains to. The records within a general user table would also have fields for work-types, which would contain data only for contractor records. In either case, network server 24 may use the example method of FIG. 6 to receive user information from administrators 26 and store the information within database 18.

Network server 24 may display user types to an administrator 26 (110) and receive a user type selection from the administrator 26 (112). Network server 24 may also receive an indication from the administrator 26 that indicates whether the administrator 26 wishes to create a new user record or modify an existing user record (114). If the administrator 26 wishes to create a new user record, network server 24 may request and receive contact information for the new user, such as name, title, address, phone number, email address, from the administrator 26 (116). The administrator 26 may provide contact information to network server manually via administrator interface 14 and a client device, or may direct network server 24 to retrieve the information from a separate database, such as a personnel database for the facility. Network server 24 may also request that the administrator 26 assign a password for the user, which may be used by the user to access system 20, and receive the password from the administrator 26 (118). Alternatively, network server 24 may assign the password and communicate it to the administrator 26.

If the user for which the record is being created is a contractor 28 (120), network interface 24 may display a list of work-types to the administrator 26 (122). Network server 24 may compile the list of work-types with reference to the work-types associated with firestopping systems in firestopping systems information 40. Based on knowledge of the contractor 28 for which the record is being created, the administrator 26 may select one or more work-types from the list that describe the work done by that contractor 28. Network server 24 may receive these selections from the administrator 26 (124).

Network server 24 may direct database server 36 to create a record for the new user within database 18 (126), and may store the information received from the administrator 26 within fields of that record (128). Depending on whether user information is maintained in separate categorical tables or a single table, network server 24 may use the user type indication received from the administrator 26 either to direct database server 36 to create the record in the appropriate table, or to as part of the information given to database server 36 to store within fields of the record.

If network server 24 determines that the administrator 26 wishes to modify an existing user record (114), network server may display a list of users of the user type previously indicated by the administrator 26 to the administrator 26 (130). The administrator 26 may select a user from this list, and network server may receive the selection (132). Network server 24 may retrieve the record for the user selected by the administrator 26 and display the user information currently stored therein (134). The administrator 26 may then make modifications to the user information. Network server 24 may receive the modifications and direct database server 36 to change the selected record according to the modifications made (136).

This process may proceed until network server 24 receives an indication that the administrator 26 no longer wishes to load or modify users (138). If the administrator 26 wishes to continue loading new users or making modifications to existing users, network server 24 may receive an indication as to whether the administrator 26 wishes to continue to load or modify the same user type, or to load or modify a new user type (140), in which case the user type list may again be displayed (110).

Figure 7:
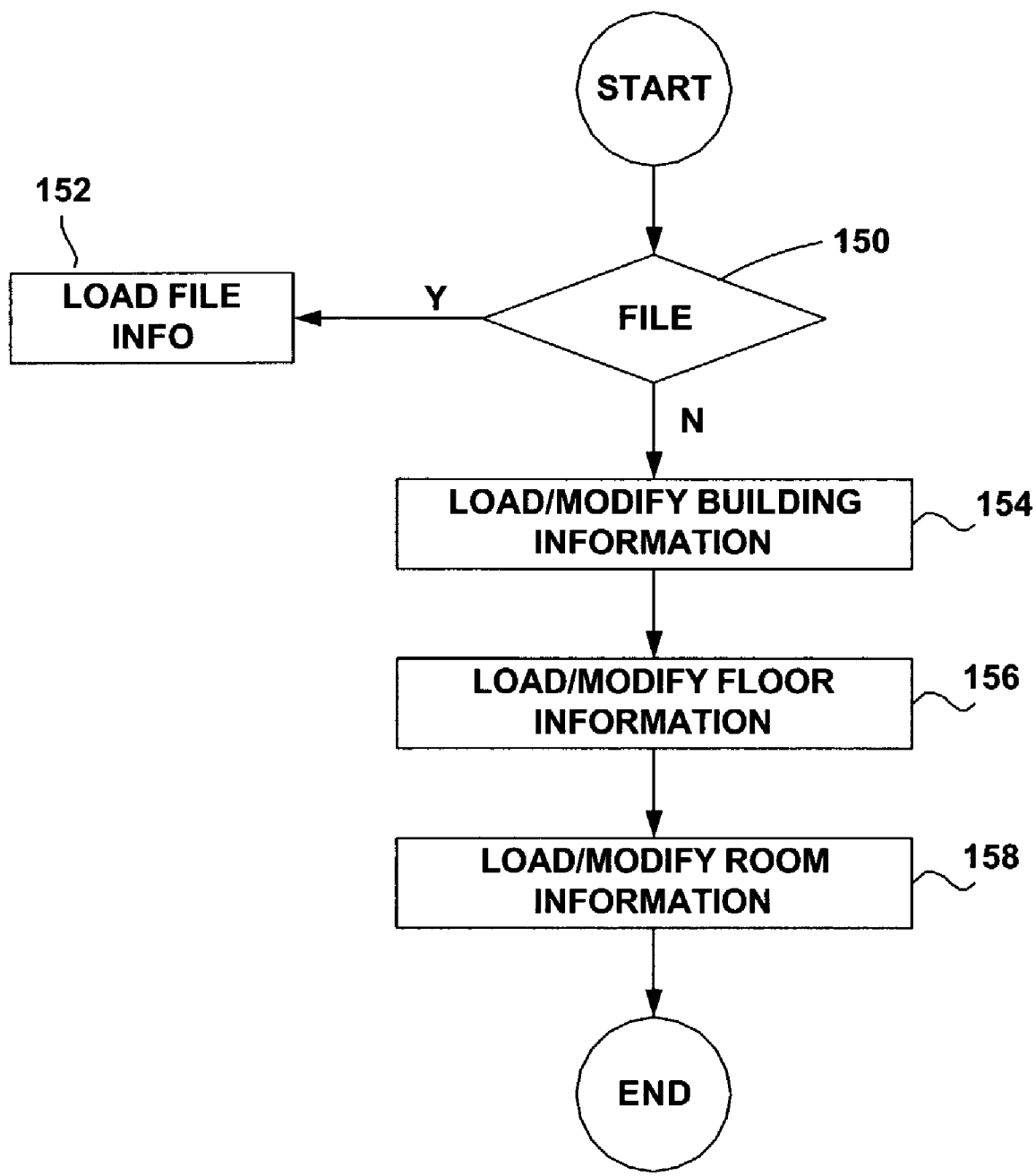
FIG. 7 is a flow diagram illustrating an example method for loading a database with location information.

FIG. 7 is a flow diagram illustrating an example method for loading database 18 with location information 50. As described above, location information 50 may take the form of one or more tables that include fields containing building names, building addresses, names of floors within the buildings, and names of rooms on the floors. In particular, network server 24 may direct database server 36 to maintain location information in database 18 within three tables—a building table, a floor table, and a room table, as described above.

Network server 24 may receive a file, such as an architectural file, computer aided drafting (CAD) file, or the like, that identifies locations within the one or more facilities, such as buildings, floors and rooms (150). The file may also depict or identify the relationships of the floors to buildings and rooms to floors. Network server 24 may extract location information 50 from this file and direct database server to store the information within database 18 (152). Where no such file is available, or where the file does not completely describe the one or more facilities, administrators 26 interacting with network server 24 may load building (154), floor (156) and room (158) information into new records within building, floor and room tables as described above, or modify existing records within the tables.

Although the present invention is not limited to the loading of this location information in any particular order, it may be desirable that administrators 26 load building information before floor information, and floor information before room information. Loading the information in this order allows network server 24 to provide administrators with lists of buildings and floors in database 18 to select from, and to use the selections made by administrators 26 to easily duplicate the information from the selected building and/or floor records in the new floor or room record being created. If the information is not loaded in this manner, the loading process may be more tedious for administrators 26 in that administrators 26 may have to manually enter information, such as a building address, multiple times.

Figure 8:
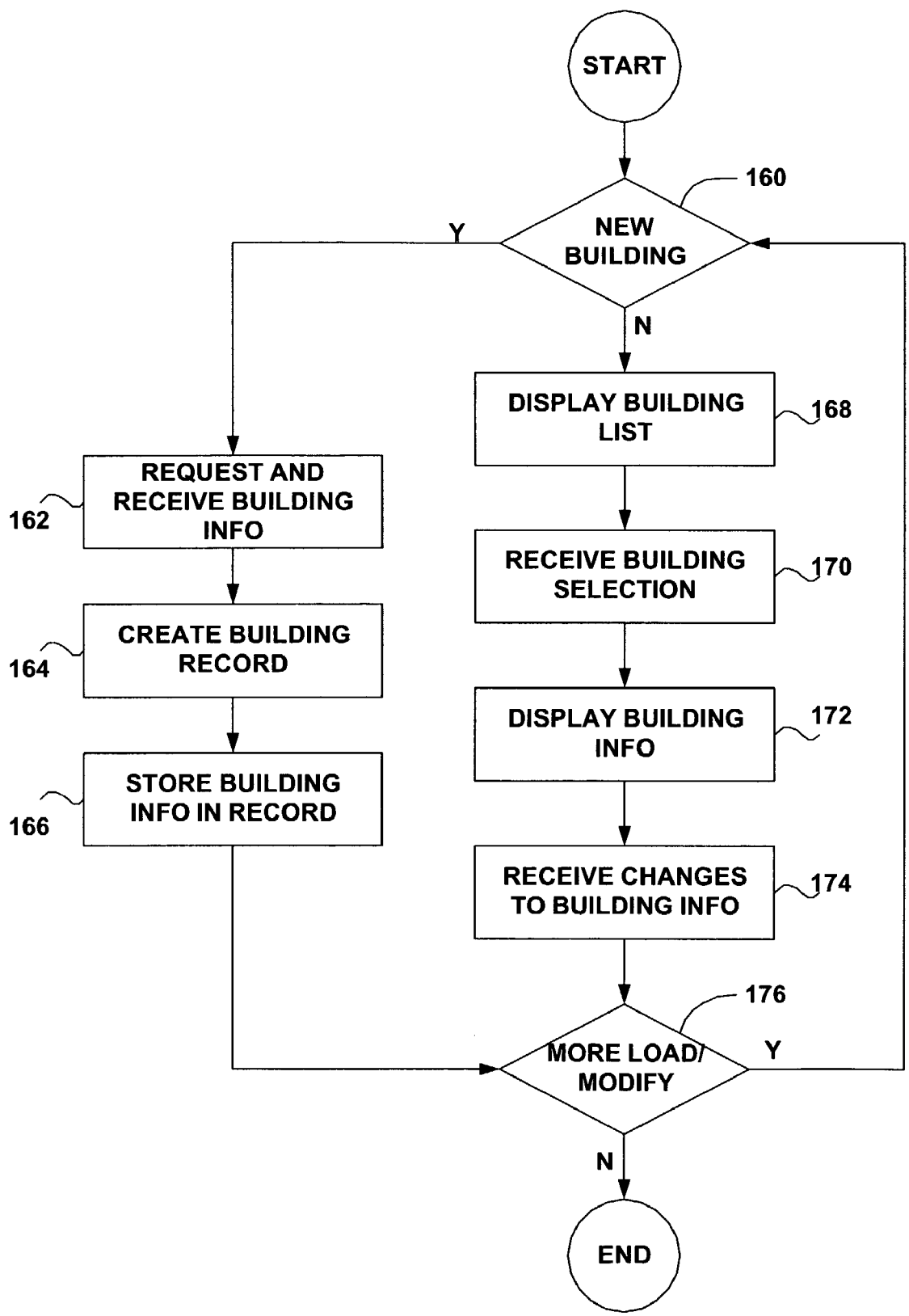
FIG. 8 is a flow diagram illustrating an example method for loading a database with building information.

FIG. 8 is a flow diagram illustrating an example method for loading database 18 with building information. Network server 24 may receive an indication from an administrator 26 as to whether the administrator 26 wishes to create a new building record or modify an existing building record (160). If the administrator 26 wishes to create a new building record, network server 24 may request and receive building information for the new building, such as building name and address, from the administrator 26 (162). Network server 24 may direct database server to create a record within the building table (164), and store the received building information within fields of the record (166).

If network server 24 receives an indication from the administrator 26 that the administrator 26 wishes to modify an existing building record within database 18 (160), network server 24 may display a list of buildings generated from building records within database 18 (168). The administrator 26 may select a building from this list, and network server may receive the selection (170). Network server 24 may retrieve the record for the building selected by the administrator 26 and display the building information currently stored therein (172). The administrator 26 may then make modifications to the building information. Network server 24 may receive the modifications and direct database server 36 to change the selected record according to the modifications made (174). This process may proceed until network server 24 receives an indication that the administrator 26 no longer wishes to load or modify buildings (176).

Figure 9:
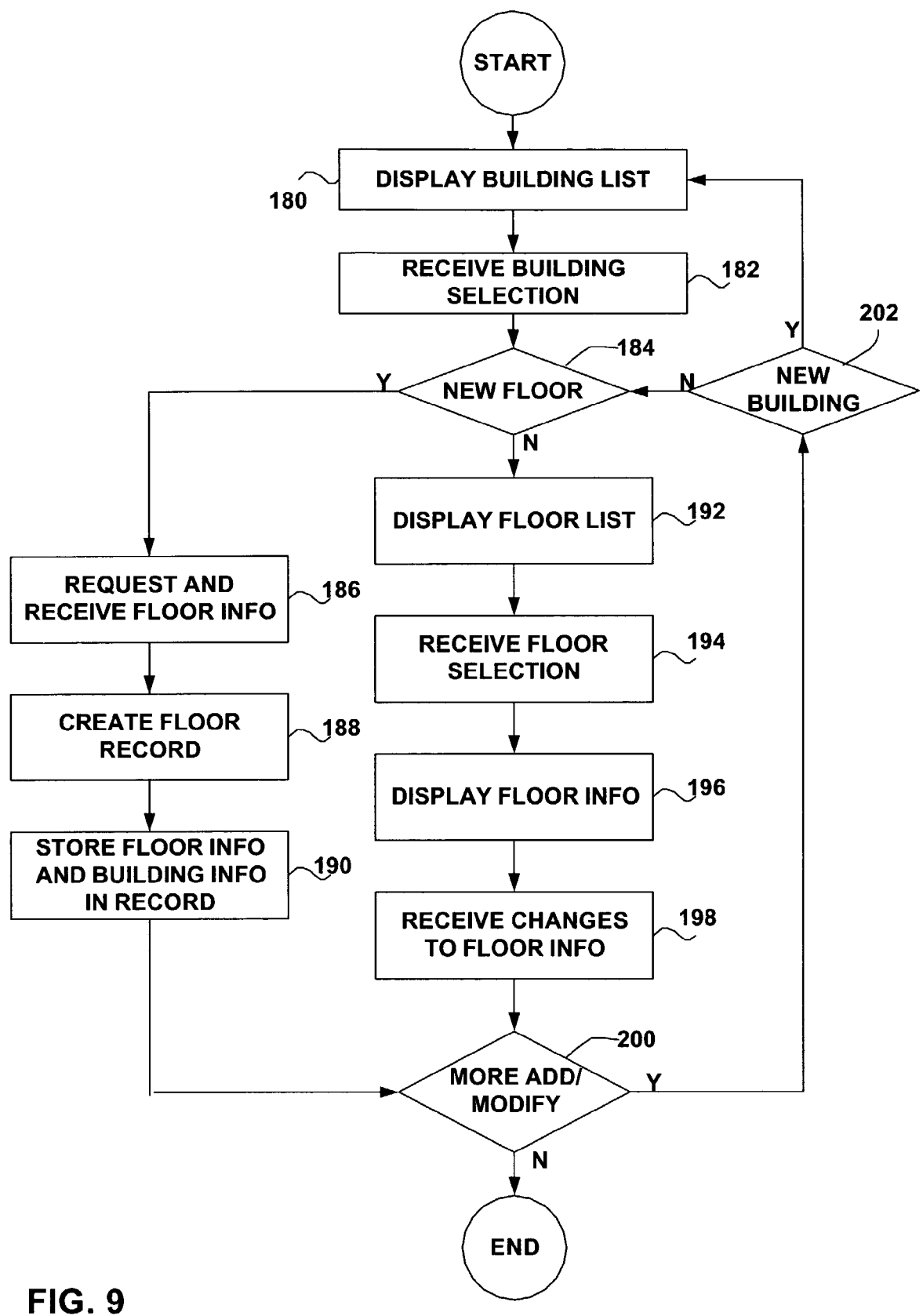
FIG. 9 is a flow diagram illustrating an example method for loading a database with floor information.

FIG. 9 is a flow diagram illustrating an example method for loading database 18 with floor information. Network server 24 may display a list of buildings generated from building records stored in database 18 to an administrator 26 (180) and receive a building selection from the administrator 26 (182). The building selected by the administrator 26 is the building in which the floor of interest is located.

Network server 24 may also receive an indication from the administrator 26 as to whether the administrator 26 wishes to create a new floor record or modify an existing floor record (184). If the administrator 26 wishes to create a new floor record, network server 24 may request and receive information for the new floor, such as a name, from the administrator 26 (186). Network server 24 may direct database server 36 to create a record for the new floor within database 18 (188), and store the floor information received from the administrator 26, as well as information stored within the record for the building selected, within fields of the new floor record (190).

If network server 24 determines that the administrator 26 wishes to modify an existing floor record (184), network server 24 may display a list of floors generated from the floor records within database 18 (192). Network server may generate the list by comparing the building selected by the administrator 26 from the building list to the building information stored within the floor records. The administrator 26 may select a floor from this list, and network server 26 may receive the selection (194). Network server 24 may retrieve the record for the floor selected by the administrator 26, and display the floor information currently stored therein (196). The administrator 26 may then make modifications to the floor information. Network server 24 may receive the modifications and direct database server 36 to change the selected record according to the modifications made (198).

This process may proceed until network server 24 receives an indication that the administrator 26 no longer wishes to load or modify floors (200). If the administrator 26 wishes to continue loading new floor records or making modifications to existing floor records, network server 24 may receive an indication as to whether the administrator 26 wishes to continue to load or modify floors within the same building, or to load or modify floors within a different building (202) in which case the building list may again be displayed (180).

Figure 10:
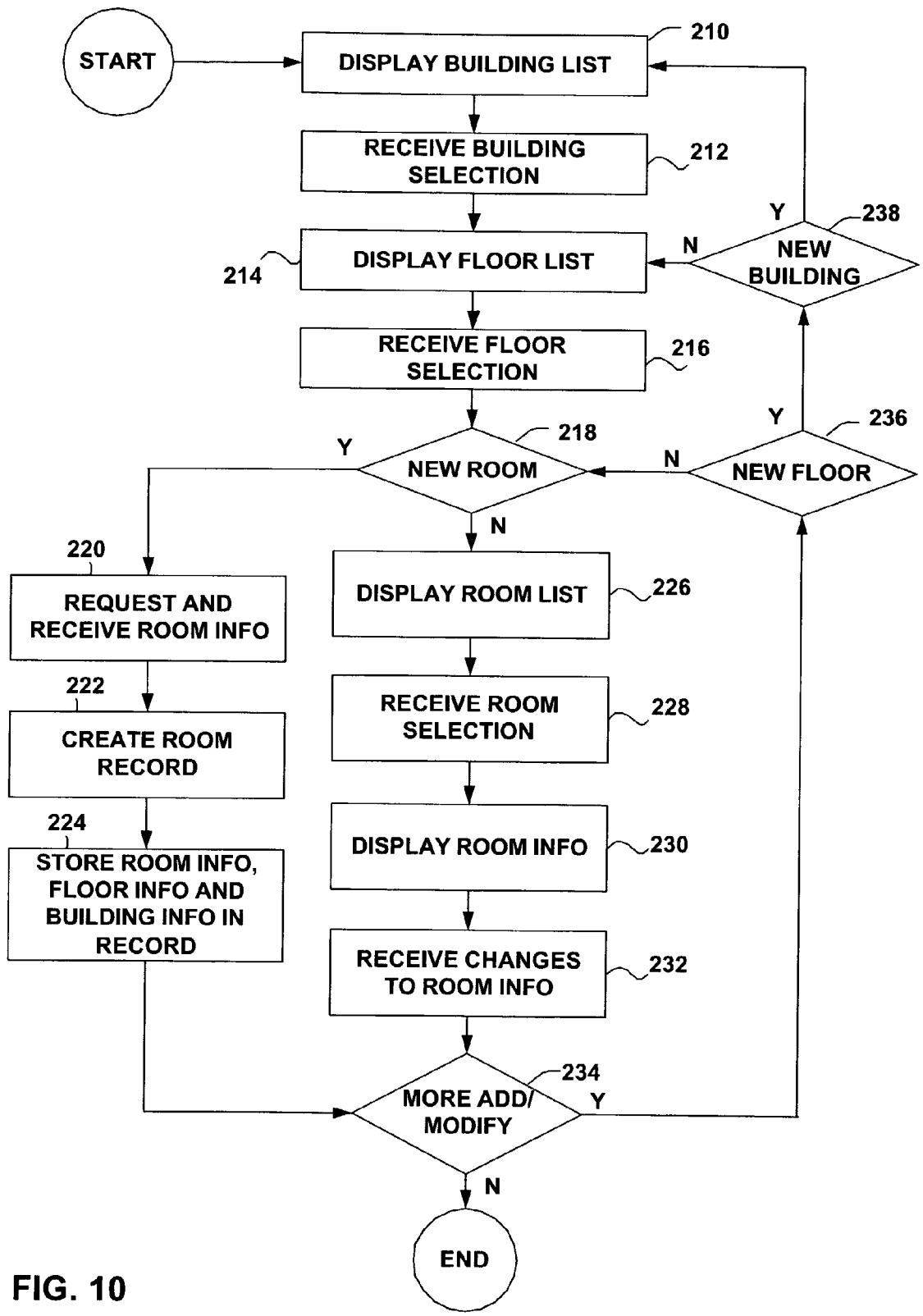
FIG. 10 is a flow diagram illustrating an example method for loading a database with room information.

FIG. 10 is a flow diagram illustrating an example method for loading database 18 with room information. Network server 24 may display a list of buildings generated from building records stored in database 18 to an administrator 26 (210) and receive a building selection from the administrator 26 (212). The building selected by the administrator 26 is the building in which the room of interest is located. Based on the building selected by the administrator 26, network server may display a list of floors generated from floor records stored in database 18 to the administrator 26 (214). Network server 24 may generate the floor list by comparing the building selected by the administrator 26 from the building list to the building information stored within the floor records. Network server 24 may receive a floor selection from the administrator 26 (216). The floor selected by the administrator 26 is the floor on which the room of interest is located.

Network server 24 may also receive an indication from the administrator 26 as to whether the administrator 26 wishes to create a new room record or modify an existing room record (218). If the administrator 26 wishes to create a new room record, network server 24 may request and receive information for the new room, such as a name, from the administrator 26 (220). Network server 24 may direct database server 36 to create a record for the new room within database 18 (222), and store the room information received from the administrator 26, as well as information stored within the records for the floor selected and the building selected, within fields of the new room record (224).

If network server 24 determines that the administrator 26 wishes to modify an existing room record (218), network server 24 may display a list of rooms generated from the room records within database 18 (226). Network server 26 may generate the list by comparing the building and floor selected by the administrator 26 from the building and floor lists to the building information and floor information stored within the room records. The administrator 26 may select a room from this list, and network server 26 may receive the selection (228). Network server 24 may retrieve the record for the room selected by the administrator 26, and display the room information currently stored therein (230). The administrator 26 may then make modifications to the room information. Network server 24 may receive the modifications and direct database server 36 to change the selected record according to the modifications made (232).

This process may proceed until network server 24 receives an indication that the administrator 26 no longer wishes to load or modify rooms (234). If the administrator 26 wishes to continue loading new room records or making modifications to existing room records, network server 24 may receive an indication as to whether the administrator 26 wishes to continue to load or modify rooms located on the same floor, or to load or modify rooms on different floor (236). Network server 24 may also receive an indication as to whether the administrator 26 wishes to load or modify room records for rooms on a different floor within the same building, in which case the same floor list may be displayed (214), or rooms on floors within a different building altogether, in which case the building list may be displayed (210, 238).

Figure 11A:
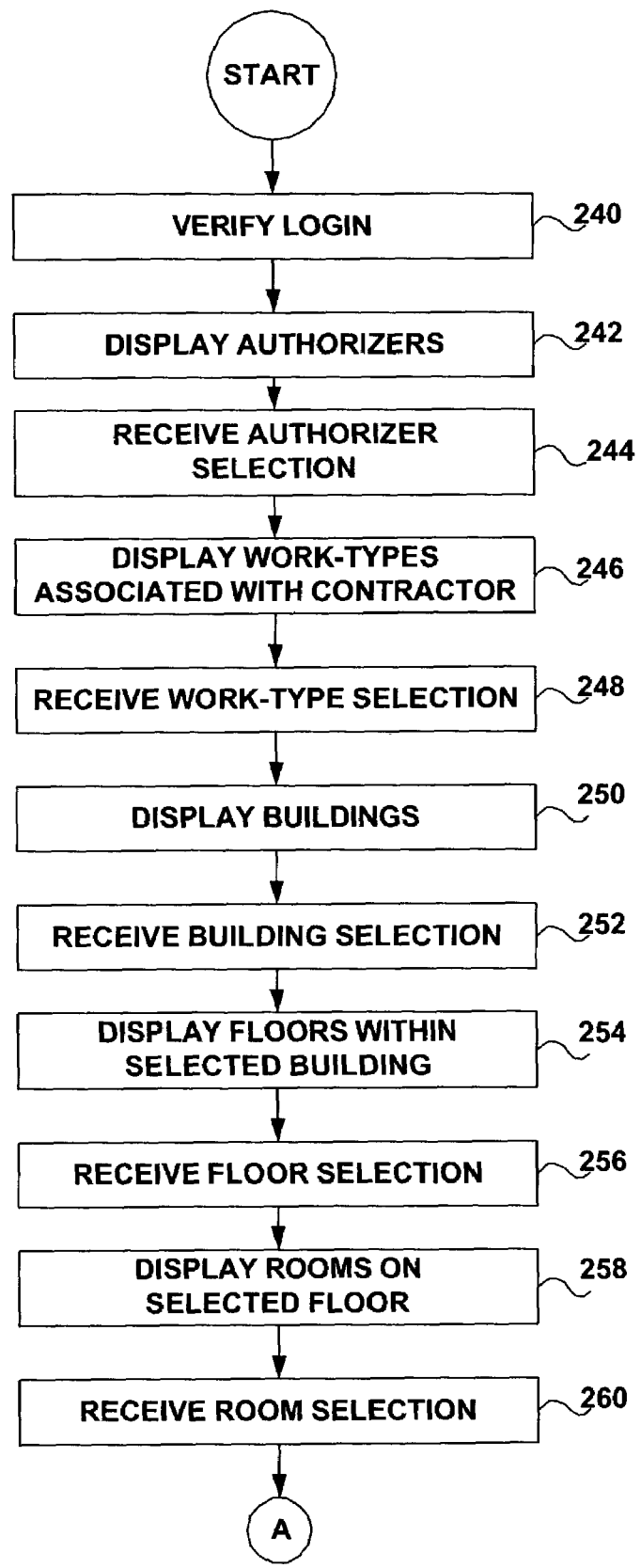
FIG. 11A is a flow diagram illustrating an example method for collecting information from contractors and issuing a permit to the contractors based on the receipt of the information.
Figure 11B:
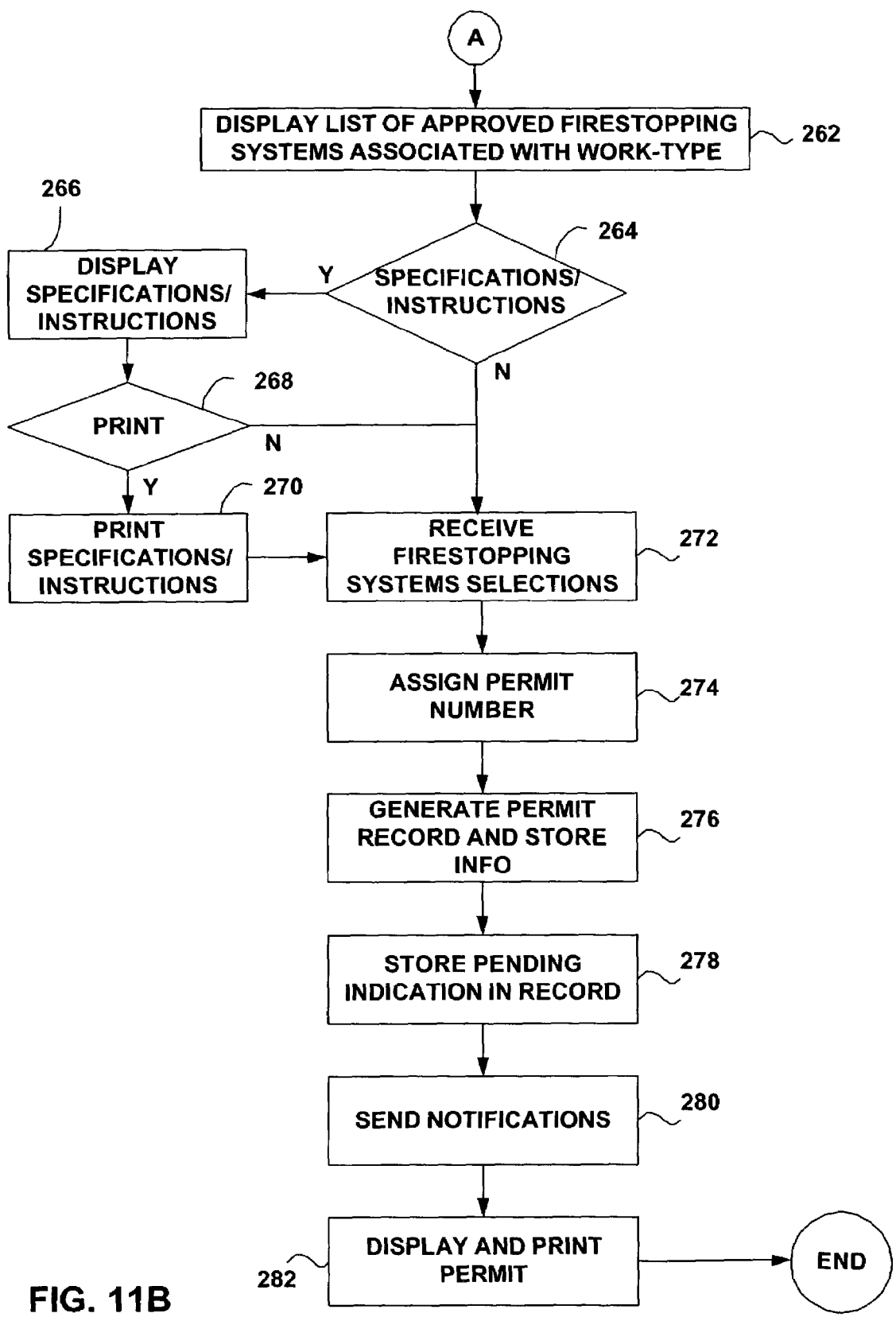
FIG. 11B is a flow diagram further illustrating the example method of FIG. 11A.

FIGS. 11A and 11B are flow diagrams that together illustrate an example method for collecting permit information 52 from contractors 28 and issuing permits to contractors 28 based on the receipt of permit information 52. As shown in FIG. 1A, after receiving a user name and password associated with a contractor 28 (240), network server 24 may present the contractor 28 with contractor interface 16 via network 22 and a client device as described above. By interacting with network server 24 via contractor interface 16, the contractor 28 may provide network server 24 with permit information 52, and receive a permit in return for providing network server 24 with permit information 52.

Network server 24 may display a list of authorizers 30 generated based on authorizer information 44 stored in records within database 18 to the contractor 28 (242), and receive an authorizer selection made by the contractor 28 (244). Network server 24 may also display a list of work-types to the contractor 28 (246). The list may include all possible work-types associated with firestopping systems as described above. Alternatively, the work-type list presented to the contractor 28 may be limited to work-types associated with that contractor 28. As described above, work-types associated with contractors 28 may be stored within fields of contractor records. Network server 24 may use the user name and password provided by the contractor 28 to search contractor records stored in database 18 and locate the contractor record associated with the contractor 28. Network server 24 may retrieve the work-types associated with that contractor 28 for display as the work-type list. The contractor 28 may select a work-type from the list that describes the work to be performed by the contractor 28 under the permit currently sought by the contractor 28. Network server 24 may receive the work-type selection (248).

Network server 24 may display a list of buildings that make up the facility to the contractor 28 (250). The list of buildings may be generated based on building records stored in database 18. The contractor 28 may select a building from the list, and network server 24 may receive the building selection (252). Network server 24 may then display a list of floors within the selected building to the contractor 28 (254). Network server 24 may generate the list of floors by searching floor records within database 18, and selecting the floor records whose fields indicate that the floor corresponding to that record is within the building selected by the contractor 28. The contractor 28 may select a floor from this list, and network server 24 may receive the floor selection (256). Network server 24 may then display as list of rooms within the selected floor to the contractor 28 (258). Network server 24 may generate the list of rooms by searching room records within database 18, and selecting room records whose fields indicate that the room corresponding to that record is within the building and on the floor selected by the contractor 28. The contractor 28 may select a room from this list, and network server 24 may receive the room selection (260).

As shown in FIG. 11B, network server 24 may then display a list of firestopping systems to the contractor 28 (262). Network server 24 may display a list of all firestopping systems stored within database 18. Alternatively, network server 24 may display a limited list of fire stopping systems.

One limitation that may be put on the fire stopping system list is the recommendation of administrators 26. As discussed above, administrators 26 may modify a field within a firestopping system record to indicate whether or not that firestopping system is recommended for use in the facility. Network server 24 may display only firestopping systems whose associated records within database 18 indicate that the firestopping system is recommended for use within the facility. Alternatively, network server 24 may generate a list containing all firestopping systems, but include an administrative recommendation indication for each firestopping system on the list. The contractor 28 may select whether to view the full list or recommended list.

Another limitation that may be put on the firestopping system list is work-types. As described above, each firestopping system record within database 18 may contain one or more work-types associated with the firestopping system, i.e., indicating that the firestopping system is approved for that type of work. Network server 24 may search the firestopping systems records for firestopping systems associated with the work-type selected by the contractor 28, and display only those firestopping systems found by the search.

The contractor 28 may request specifications or instructions for any firestopping system on the list (264). These specifications or instructions, or their location, may be stored in database 18, as described above. If network server 24 receives such a request from the contractor 28, network server 24 may retrieve the requested file from the database or use the location information to retrieve the requested file from a file archive or the Internet. Network server 24 may then send the file to the client device for display thereon (266). Contractors 28 may also print the file using a printer associated with the client device, or network server may send the file to a stand-alone printer (not shown) on network 22 upon receiving a request to print the file (268, 270).

Whether or not specifications or instructions are needed, when the list of firestopping systems is displayed, contractor 28 may select one or more firestopping systems from the list. These firestopping systems selected correspond to the firestopping systems that the contractor 28 intends to install in the penetration or around the duct to which the permit sought by the contractor 28 pertains. Network server 24 may receive these firestopping system selections (272).

When network server 24 has received all of the above information, and the contractor 28 indicates that all selections for the permit have been made, network server 24 may assign a permit number to the permit (274), and direct database server 36 to generate a record containing the information collected for the permit and store the record in database 18 (276). The information stored in the record may include the authorizer, work-type, building, floor, room and firestopping systems selected by the contractor, the permit number, and other information such as the time and date that the record was created. The information may also include an indication that the permit is pending in the record to flag the record for review by administrators 26 as part of an internal review process as described above (278). At this time, network server 24 may send notifications to administrators 26 or the authorizer 30 selected by the contractor 28 (280).

The notifications may be sent as email messages via network 22 using email addresses retrieved from administrator information 42 and authorizer information 44 stored within database 18.

Network server 24 may also display the permit to the contractor 28, and the permit may be printed (282). The permit number may be included on the permit, and may be used by the contractor 28 to reaccess the record created to make modifications. If, for example, the firestopping systems installed by the contractor 28 varied from those the contractor 28 selected during the permit process, the contractor 28 could reaccess the record and make this modification. Network server 24 may send notifications to administrators 26 or authorizers 30 as described above at this time. These notifications may also be sent as email messages, telephone messages, pager messages, modal messages displayed within the application running on client devices, or the like, and may require approval feedback from an administrator 26 or authorizer 30 prior to including the modifications in the permit record, e.g., by return email or clicking approval within the application running on the client device.

Figure 12:
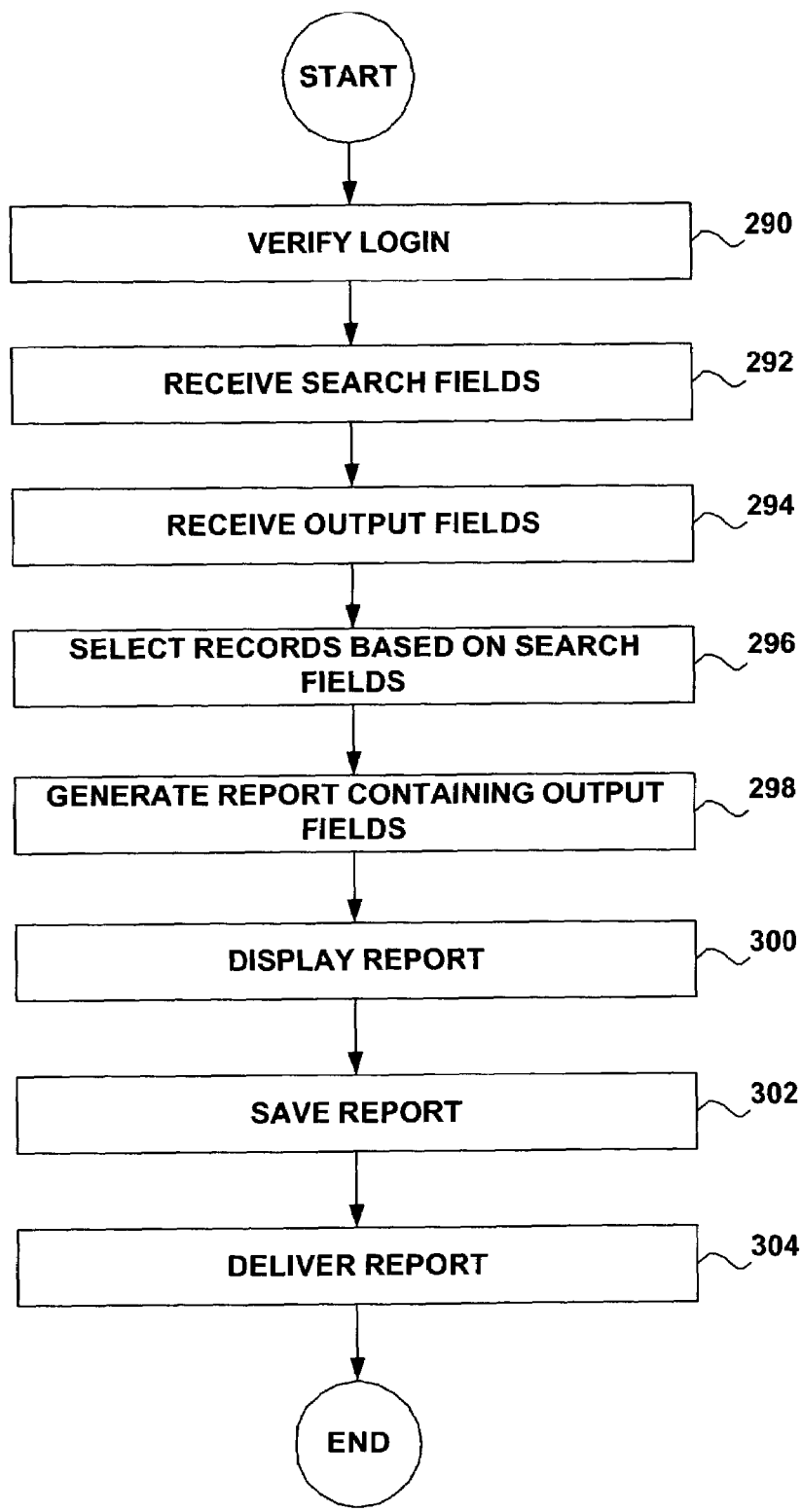
FIG. 12 is a flow diagram illustrating an exemplary method for generating a report containing firestopping information for a facility.

FIG. 12 is a flow diagram illustrating an exemplary method for generating a report. Upon receiving a user name and password associated with an administrator 26 (290), network server 24 may present the administrator 26 with administrator interface 14 via network 22 and a client device as described above. By interacting with network server 24 via administrator interface 14, the administrator 26 may, as described above, direct network server 24 to access and search permit information 52, and to generate reports based on permit information 52. These reports may be generated for the benefit of administrators 26 and reviewers 32, and the report or its location may be stored in database 18 as report information 54 for later access by administrators 26 and reviewers 32.

Network server 24 may receive search fields (292) and output fields (294) from the administrator 26. The search fields and output fields may correspond to fields within the permit records of database 18. For example, if the administrator 26 wants a report of all permits issued to a particular contractor 28 during a particular month, the administrator 26 would provide the contractor name and month desired as the search fields. Network server 24 may search the permit records within database 18 for those records whose contractor name and date fields match the search fields provided by the administrator 26, and select those records (296). If, for example, the administrator 26 wants the report to display the firestopping systems and locations indicated in those records in addition to the contractor name and date, the administrator 26 would provide these four items as the output fields. Network server 24 may generate a report displaying the information indicated within the output fields of the selected records (298). System 20 may provide preprogrammed searches with preprogrammed search and output fields that would be available to the administrator by selecting such a search. Upon generating the report, network server 24 may display the report to the administrator 26 via the client device associated with the administrator 26 (300), direct database server 36 to store the report within database 18 (302), or deliver the report to reviewers 32 (304), as described above.

Figure 13:
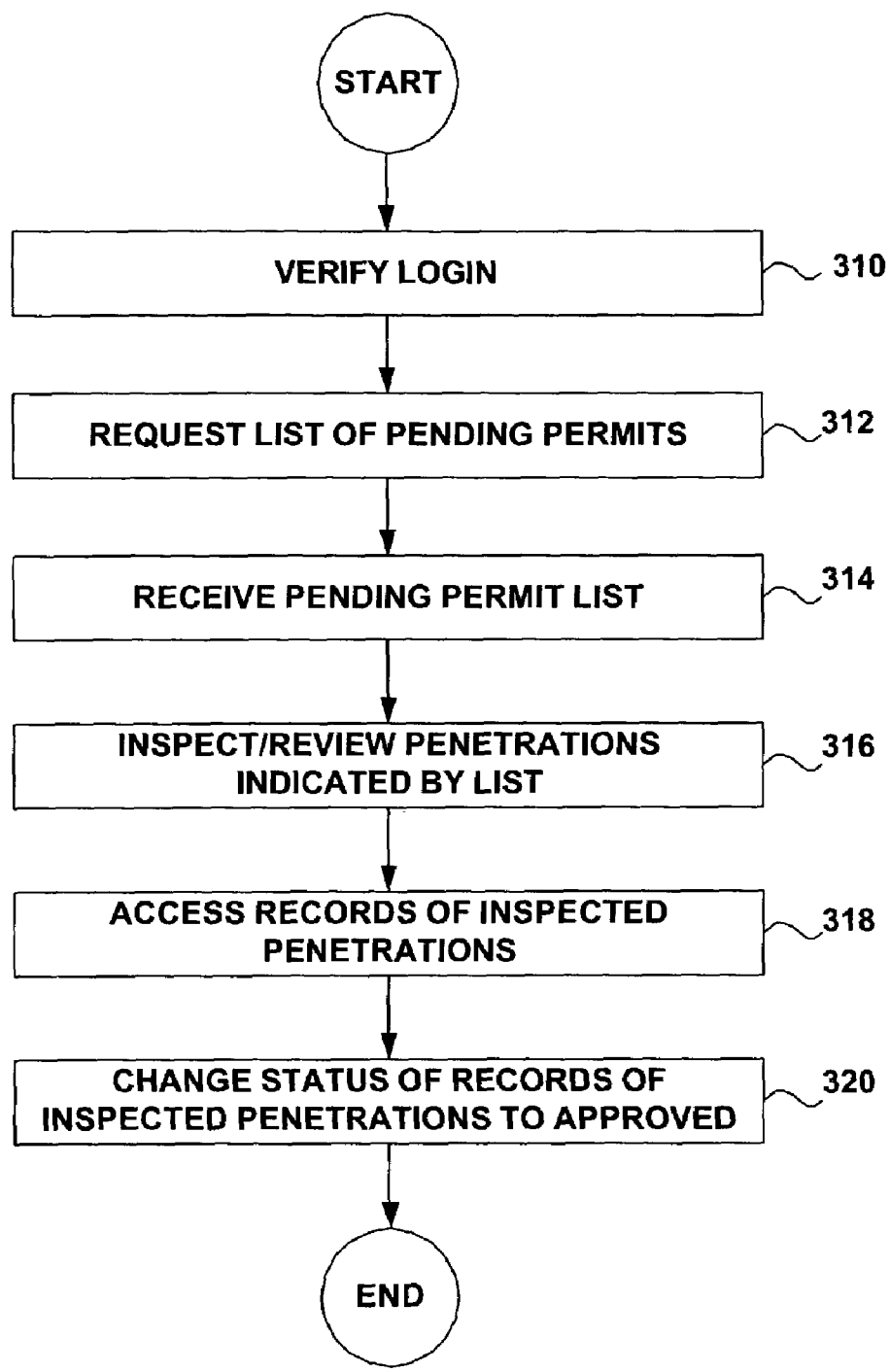
FIG. 13 is a flow diagram illustrating an exemplary approval process for installation of firestopping materials within a facility.

FIG. 13 is a flow diagram illustrating an exemplary permit approval process. Upon receiving a user name and password associated with an administrator 26 (310), network server 24 may present the administrator 26 with administrator interface 14 via network 22 and a client device as described above. As described above, the permit review process may advantageously be conducted by the administrator 26 using a mobile client device.

As described above, when network server 24 creates a permit record, it may include an indication in an approval field in that record that indicates that the permit is pending, i.e., flagging the record for review by administrators 26. The administrator 26 may request a listing of all pending permits (312), which network server 24 may generate by searching the permit records in database 18 for records that have the pending indication in the approval field. This listing may include for the permit information from each selected record.

The administrator 26 may receive the listing via the client device (314), and proceed to inspect the penetrations indicated by the listing, or otherwise review the listing to determine if the information within the indicated permit records is accurate (316). Inspecting the penetrations indicated by the listing may involve using the location information within a permit record to find the penetration corresponding to that permit record, and inspecting the work done by the contractor 28 to be sure that it will satisfies a regulatory agency or audit organization. If the administrator 26 finds that the work inspected is adequate, the administrator 26 may access the records of the penetrations inspected (318), and modify the approval field therein to indicate that the permit is approved (320).

Figure 14:
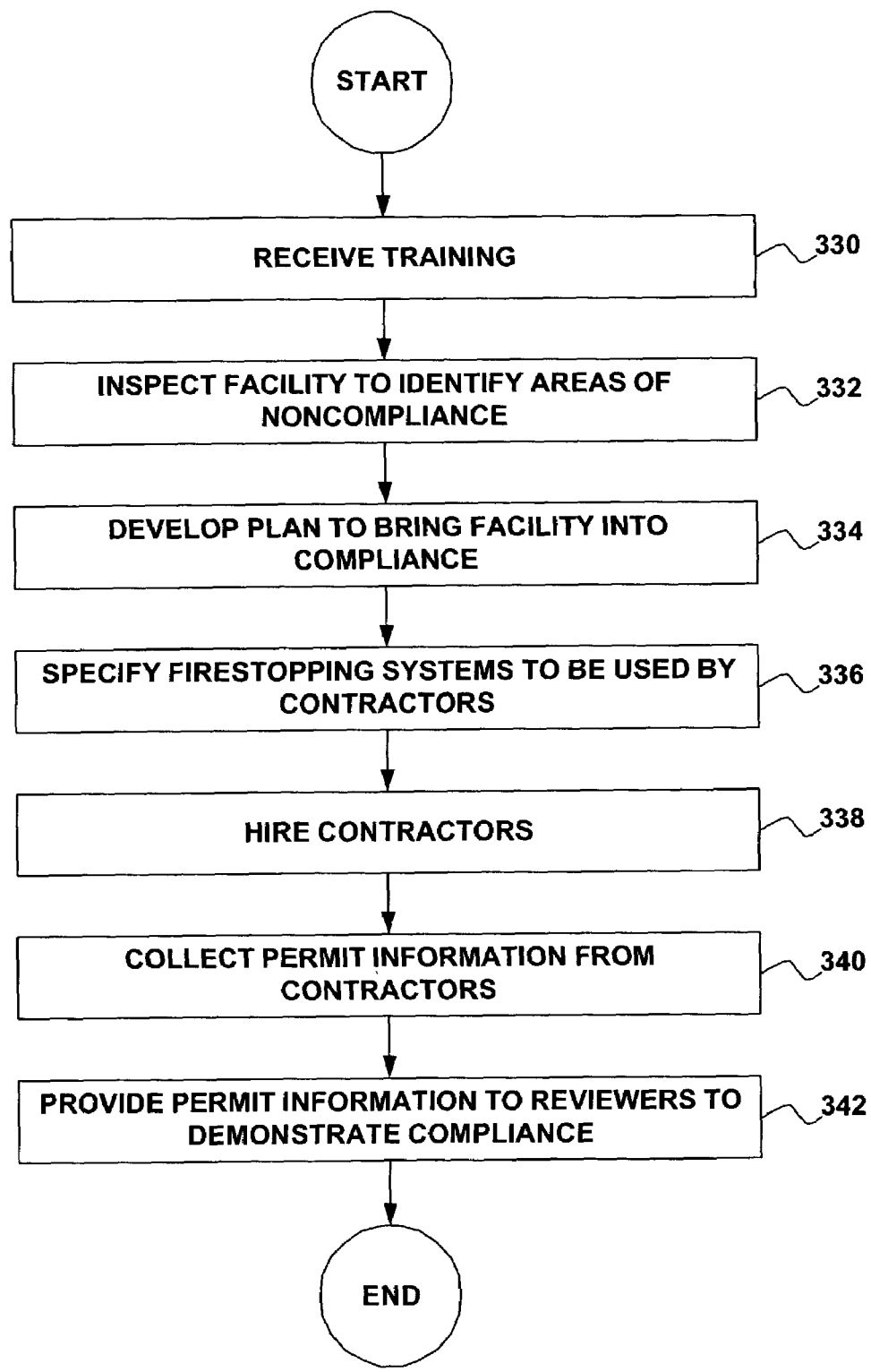
FIG. 14 is a flow diagram illustrating an exemplary method for achieving, maintaining and demonstrating the compliance of a facility with relevant firestopping regulations.

FIG. 14 is a flow diagram illustrating an exemplary method for achieving, maintaining and demonstrating the compliance of a facility with relevant firestopping regulations. In order for administrators 26 to understand what firestopping measures are required within the facility by the firestopping regulations that apply to the facility, it may be desirable for administrators 26 to receive training (330). Further, in order to assure that firestopping systems installed in the facility are selected and installed such that the facility will be in compliance with the relevant regulations, it may be desirable for contractors 28 to receive training. Training may be provided to administrators 26 and contractors 28 by an entity associated with reviewers 32, or by an independent entity who provides such training, such as a manufacturer of firestopping systems. The training may also be delivered via an interactive software application executing on device 10, executing on network server 24 and provided by client devices of system 20, or executing on some other computing device. The training provided to administrators 26 and contractors 28 may inform administrators 26 and contractors 28 about the relevant regulations, and teach administrators 26 and contractors 28 proper selection and installation of firestopping systems for various types of penetrations or ducts. Administrators 26 and contractors 28 may receive differing levels of training. In order to assure that firestopping systems installed in the facility are selected and installed such that the facility will be in compliance with the relevant regulations, administrators 26 may desire to limit the hiring of contractors 28 for the facility to contractors 28 who have received such training.

Administrators 26 may inspect the facility to identify areas of noncompliance (332). While inspecting the facility, administrators 26 may apply the information regarding relevant regulations and proper selection and installation of firestopping systems received during training as described above. Administrators 26 may identify fire-rated walls, floors, floor-ceiling assemblies, grease and air ducts, and the like within the facility, and identify the ratings of these structures. Administrators 26 may find this information in one or more life safety plans (LSPs) for the buildings of the facility. Administrators may compare this information to the regulations to determine the firestopping requirements for penetrations of these structures or reinforcement of the ductwork. Administrators 26 may identify penetrations and ductwork within the facility during a building-by-building, floor-by-floor, room-by-room inspection of the facility, and determine whether the firestopping systems installed for those penetrations and ducts, if any, were selected and installed in compliance with the regulations. Administrators 26 may record any areas of noncompliance within the facility so that they may be remedied in the future. Where the facility is a health care facility, administrators 26 may use the JCAHO statement of conditions (SOC) form to guide them through the process of identifying fire-rated structures, determining firestopping requirements, and recording any areas of noncompliance.

Using the information received during training administrators 26 may then develop a plan to remedy the areas of noncompliance identified within the facility (334). The plan may involve prioritization among the various areas of noncompliance. Administrators may use information received during training to identify priority tasks, i.e., to identify the areas of noncompliance that pose the greatest threat to the safety of occupants of the facility. The plan may further involve assigning tasks and setting times for the completion of the tasks. Administrators 26 may use a Gantt chart, as a representation of the plan, to assist them when determining whether the tasks are being performed on schedule.

Administrators 26 may also use the regulation and firestopping system information received via training to specify firestopping systems to be used to remedy particular areas of noncompliance of particular classes of penetrations or ducts (336). In this manner, administrators 26 may control the work done by contractors 28 to assure compliance with the relevant regulations and the safety of the occupants of the facility. Administrators 26 may make the specifications a part of contracts with or purchase orders sent to contractors 28, and may specify use of the specified firestopping systems as a condition of said contracts. Administrators 26 may further use device 10 or system 20 to indicate to contractors 28 that the specified firestopping systems are recommended for use within the facility, as described above. In some embodiments of the method, administrators 26 may use a software application executing on device 10, executing on network server 24 and provided by client devices of system 20, or executing on some other computing device to assist with the selection of firestopping systems for the specification. The application may present administrators 26 with a series of questions related to the facility. A CPU within the computing device executing the application may use the answers to present appropriate firestopping systems to administrators 26 for inclusion in the specification.

Administrators 26 or authorizers 30 may then hire contractors 28 to remedy the areas of noncompliance within the facility according the plan to achieve compliance developed by administrators 26 (338). Authorizers 30 may also hire contractors 28 to perform other work in the facility that may involve the creation of new penetrations, the installation of new ducts, or the installation of new firestopping systems. Administrators 26 may use device 10 or system 20 to collect information from contractors 28 (340) and to provide this information to reviewers, for example, in the form of reports (342), as described above.

Various embodiments of the invention have been described. These and other embodiments are within the scope of the following claims.

The invention claimed is:

1. A method comprising;
   inspecting a facility to identify one or more penetrations of a fire-rated structure within the facility;
   determining noncompliance of the penetrations with firestopping regulations, wherein firestopping regulations concern devices and/or materials that protect against the passage of any of flames, gases, and smoke through openings that are created for penetrations;
   developing a plan to remedy the noncompliant penetrations;
   hiring at least one contractor to remedy the noncompliant penetrations according to the plan;
   collecting information from the contractor that identifies the contractor and at least a portion of work to be done by the contractor, the information collected via a self-serve computer kiosk located in proximity to the facility's entrance; and,
   based on the information collected from the contractor, facilitating access to the facility.

2. The method of claim 1, further comprising:
   collecting information from the contractor that describes the work done by the contractor; and,
   providing the information collected from the contractor to at least one reviewer.

3. The method of claim 1, wherein facilitating access to the facility comprises granting or denying access to the facility.

4. The method of claim 1, wherein determining noncompliance of the penetrations with firestopping regulations comprises:
   determining the requirements of the regulations for identified fire rated structures;
   determining whether the structures are in compliance with the regulation requirements; and
   recording areas of noncompliance.

5. The method of claim 1, wherein the at least one contractor remedies the noncompliant penetration installing firestopping system, and further comprising specifying the firestopping systems to be installed by the at least one contractor within the facility.

6. The method of claim 1, wherein collecting information from the contractors that describes the work done by the contractors comprises:
   collecting information that describes at least one penetration of a fire-rated structure within a facility and an installation of a fire-rated duct within the facility from the at least one contractors;
   generating at least one record for each penetration or duct based on the collected information; and
   storing the record or records in a database.

7. The method of 6, further comprising:
   receiving a request for a report from an administrator;
   generating the report based on the request and the record or records; and
   providing the report to the administrator, and wherein providing the information to a reviewer comprises providing the report to a reviewer.

8. The method of claim 7, wherein the reviewer comprises a regulatory agency or an audit organization.

9. The method of claim 1, wherein the fire-rated structure is among a group consisting of fire-resistive walls, fire-resistive floors, fire-resistive floor/ceiling assemblies, fire-resistive grease ducts, and fire-resistive air ducts.

10. The method of claim 1, wherein the self-serve computer kiosk facilitates collection of information by presenting the contractor with lists of permissible selections for the collection of the information.

11. The method of claim 1, further comprising generating a work permit for the contractor.

* * * * *

UNITED STATES PATENT AND TRADEMARK OFFICE
CERTIFICATE OF CORRECTION

PATENT NO. : 7,197,514 B2 Page 1 of 1
APPLICATION NO. : 10/217343
DATED : March 27, 2007
INVENTOR(S) : Robert J. Boros It is certified that error appears in the above-identified patent and that said Letters Patent is hereby corrected as shown below:

<u>Title Page, First Page, Item [56] Col. 2, under (Other Publications)</u>
Line 10, after "2005" delete ")".
Line 12, delete "construction" ," and insert --construction", --, therefor.

<u>Col. 6</u>
Line 35, after "system" insert -- 10 --.

<u>Col. 21</u>
Line 18, delete "FIG. 1A," and insert --FIG. 11A, --, therefor.

<u>Col. 22</u>
Line 5, delete "fire stopping" and insert --firestopping --, therefor.
Line 7, delete "fire stopping" and insert --firestopping --, therefor.

<u>Col. 26</u>
Line 2, in Claim 1, delete "comprising;" and insert -- comprising: --, therefor.
Line 40, in Claim 5, after "installing" insert -- a --.
Line 54, in Claim 7, after "of" insert -- claim --.

Signed and Sealed this

Twelfth day of June, 2007

JON W. DUDAS
*Director of the United States Patent and Trademark Office*